United States Patent
Khoshnegar Shahrestani et al.

(10) Patent No.: US 12,370,825 B2
(45) Date of Patent: Jul. 29, 2025

(54) OPTICAL SECURITY DEVICE PROVIDING COLOR SWITCHING OR IMAGE SWITCHING EFFECT

(71) Applicant: Authentix, Inc., Addison, TX (US)

(72) Inventors: Milad Khoshnegar Shahrestani, Coquitlam (CA); Clint K. Landrock, North Vancouver (CA); Ehsan Nahvi, Woodbury, MN (US)

(73) Assignee: Authentix, Inc., Addison, TX (US)

( * ) Notice: Subject to any disclaimer, the term of this patent is extended or adjusted under 35 U.S.C. 154(b) by 0 days.

(21) Appl. No.: 18/600,714

(22) Filed: Mar. 9, 2024

(65) Prior Publication Data

US 2024/0208258 A1  Jun. 27, 2024

Related U.S. Application Data

(63) Continuation-in-part of application No. PCT/US2022/043062, filed on Sep. 9, 2022.
(Continued)

(51) Int. Cl.
*B42D 25/324* (2014.01)
*B42D 25/29* (2014.01)
(Continued)

(52) U.S. Cl.
CPC .......... *B42D 25/387* (2014.10); *B42D 25/29* (2014.10); *B42D 25/324* (2014.10);
(Continued)

(58) Field of Classification Search
CPC .............................. B42D 25/324; G02B 5/008
See application file for complete search history.

(56) References Cited

U.S. PATENT DOCUMENTS

2017/0239972 A1  8/2017  Zhang et al.
2020/0130396 A1  4/2020  Godfrey et al.
(Continued)

FOREIGN PATENT DOCUMENTS

EP     2075767 A1 *  7/2009 ............ B42D 25/29
KR   102513874 B1 *  3/2023
(Continued)

OTHER PUBLICATIONS

Foreign Communication from Related Application—International Search Report and Written Opinion of the International Searching Authority, International Application No. PCT/US22/43062, dated Dec. 29, 2022 8 pages.

*Primary Examiner* — Kyle R Grabowski
(74) *Attorney, Agent, or Firm* — Conley Rose, P.C.; Rodney B. Carroll

(57) ABSTRACT

An optical security feature has pixels with faceted microstructures supporting nano-patterned optical filters. Each of the pixels includes a substrate and a nanostructure. The substrate is configured to emit light of at least a first wavelength and a second wavelength different than the first wavelength. The microstructure includes a first facet, a second facet non-parallel to the first facet, a first nano-patterned optical filter disposed on the first facet, and a second nano-patterned optical filter disposed on the second facet. The first nano-patterned optical filter includes a first stopband that includes the first wavelength and excludes the second wavelength. The second nano-patterned optical filter includes a second stopband that includes the second wavelength and excludes the first wavelength. For each pixel, the first nano-patterned optical filter inhibits emission of light at the first wavelength from the pixel via the first facet.

20 Claims, 12 Drawing Sheets

Related U.S. Application Data

(60) Provisional application No. 63/403,283, filed on Sep. 1, 2022, provisional application No. 63/242,337, filed on Sep. 9, 2021.

(51) Int. Cl.
  *B42D 25/387* (2014.01)
  *B42D 25/425* (2014.01)
  *G02B 1/00* (2006.01)
  *G02B 5/00* (2006.01)

(52) U.S. Cl.
  CPC ............ *B42D 25/425* (2014.10); *G02B 1/002* (2013.01); *G02B 5/008* (2013.01)

(56) References Cited

U.S. PATENT DOCUMENTS

2020/0341174 A1* 10/2020 Keshavarz Akhlaghi ................... G02B 5/0263
2023/0226841 A1* 7/2023 Geiseler ............... B42D 25/382
  250/362

FOREIGN PATENT DOCUMENTS

| WO | 2020122952 A1 | 6/2020 |
| WO | 2021159183 A1 | 8/2021 |
| WO | 2023039167 A1 | 3/2023 |

* cited by examiner

OPTICAL SECURITY DEVICE PROVIDING COLOR SWITCHING OR IMAGE SWITCHING EFFECT

CROSS REFERENCE TO RELATED APPLICATION

This application is filed under 35 U.S.C. § 111(a) and is based on and hereby claims priority under 35 U.S.C. § 120 and § 365(c) from International Application No. PCT/US2022/043062, filed on Sep. 9, 2022, and published as WO 2023/039167 A1 on Mar. 16, 2023, which in turn claims priority from U.S. provisional application no. 63/242,337 filed on Sep. 9, 2021, and U.S. provisional application no. 63/403,283 filed on Sep. 1, 2022. This application is a continuation-in-part of International Application No. PCT/US2022/043062, which is a continuation-in-part of U.S. provisional application Nos. 63/242,337 and 63/403,283. International Application No. PCT/US2022/043062 is pending as of the filing date of this application, and the United States is an elected state in International Application No. PCT/US2022/043062. This application claims the benefit under 35 U.S.C. § 119 from U.S. provisional application Nos. 63/242,337 and 63/403,283. The disclosure of each of the foregoing documents is incorporated herein by reference.

TECHNICAL FIELD

The present disclosure relates to optical security, and more specifically to displays useful for optical security features.

BACKGROUND

The banknote and brand protection industry often uses color-shifting security features in which the color of the image produced by the security feature is different at different viewing angles. The color-shifting effect in conventional security features is produced by multi-layer filters composed of stacked optical thin films or cholesteric liquid crystal.

The multi-layer stacks of conventional color-shifting security features are composed of periodic layers of high refractive index (HRI) and low refractive index (LRI) optical thin films, and provide color shifting properties at the visible spectrum using Fabry-Pérot resonances. The transmission spectrum of the security features shifts towards more blue with increasingly oblique viewing angles and may be combined with visible fluorescence of ultra-violet (UV) pigments. UV pigments may be utilized to create authentication security features in which the color pigments of a UV fluorescing layer are illuminated by UV light at a standard UV wavelength and fluoresce at visible wavelengths. The multi-layer stack selectively transmits a specific range of wavelengths of the fluoresced visible light depending on the viewing angle, inducing a color-shift effect.

In contrast to color-shifting effects, in which the color of the image gradually shifts as the viewer moves through different viewing angles, color switching effects include a more discrete change from one image to another image when the viewer moves through different viewing angles. The image change may be completely different images, or may be the same image in a different color.

Providing security features that include a color switching effect requires that the security feature have certain transmission and reflection magnitudes in order to display a vivid set of colors per image. In order to display a vivid set of colors per image, the color-switching security feature desirably includes a relatively low transmission level, for example less than 20% transmission, at a stop-band having a sufficiently wide bandwidth, such as for example 40-50 nm, to be desirably aligned with the fluorescence peak, in the case of security features having UV pigment. Providing such desired spectral characteristics utilizing conventional Fabry-Pérot interferometer type security features is challenging and economically inefficient because of the large number of HRI-LRI layers, typically 5 or more, used to provide such desired spectral characteristic. The large number of HRI-LRI layers required for such security features present a challenging to manufacture at an industrial scale and therefore limits their widespread use.

Thus, what is needed are improvements in color-switching security features.

SUMMARY

It has been discovered that improved color-switching security features can be provided by combining optical filters including a dielectric or metallic nano-patterned surface with a light emissive material in displays composed of multi-faceted pixels.

This discovery has been exploited to develop the present disclosure, which, in part, is directed to displays suitable for use in optical security features and in optically variable authentication security features enabled by optical filters including a dielectric or metallic nano-patterned surface. Optical filters that include a nano-patterned surface may also be referred to as meta-surface filters herein. The disclosed displays may be utilized in security features that provide color or image-switching ultraviolet (UV) fluorescence-based effects by integrating nano-patterned filters with microstructures that form facets on the pixels of the devices. The disclosure also describes a process for manufacturing nano-patterned filters by imprinting metastructure patterns onto thermoplastic polymer or photopolymer resin and coating the imprinted resin with dielectric or metallic thin film in a vacuum coating chamber. The nano-patterned filter is designed to be transmissive to UV light and provides a band-stop at specific tailorable UV fluorescing wavelengths, such as for example, red and green. The color-switching effect is enabled by different wavelengths being filtered by differently structured nano-patterned filters sitting on distinctly angled facets of the pixels.

In one aspect, the present disclosure provides an optical security feature including: multiple pixels, each pixel including a substrate configured to emit light of at least a first wavelength and a second wavelength different from the first wavelength, and a microstructure including a first facet and a second facet non-parallel to the first facet. The microstructure includes a first nano-patterned filter provided on the first facet, the first nano-patterned filter including a first stopband that includes the first wavelength and excludes the second wavelength, and a second nano-patterned filter provided on the second facet, the second nano-patterned optical filter including a second stopband that includes the second wavelength and excludes the first wavelength.

In some examples, for each pixel, the first nano-patterned optical filter inhibits emission of light at the first wavelength from the pixel via the first facet. When viewed at a first viewing angle associated with the first facet, the pixel can appear a first color comprising the second wavelength.

In some examples, for each pixel, the second nano-patterned optical filter inhibits emission of light at the second wavelength from the pixel via the second facet. When viewed at a second viewing angle associated with the second facet, the pixel can appear a second color comprising the first wavelength.

In examples, the substrate includes ultra-violet (UV) ink or other fluorescent material configured to emit the light including the first wavelength and second wavelength when the UV ink is irradiated by UV light. The microstructure can include a first material substantially transparent for light having the first and second wavelengths and substantially transparent to the UV light.

In certain examples, at least one of the first and second nano-patterned optical filters include a lattice of nanostructures on a surface of the respective facet. The nanostructures can include a filter material having an index of refraction larger than an index of refraction of a first material of the microstructure. The first and second nano-patterned optical filters can be embedded in the first material. The filter material can be a dielectric material.

In some examples, at least one of the first and second nano-patterned optical filters include a dielectric nano-patterned optical filter.

The filter material can be a metallic material.

In certain examples, at least one of the first and second nano-patterned optical filters includes a plasmonic nano-patterned optical filter.

In some examples, the nanostructures include multiple nanoholes and/or nanoposts.

In certain examples, the microstructure includes a first material and the first and second nano-patterned optical filters, respectively, include a first lattice of nanostructures and second lattice of nanostructures, the first lattice including a dielectric material having an index of refraction larger than an index of refraction of the first material, and the second lattice including a metallic material.

In some examples, the first nano-patterned optical filter includes a first lattice of nanostructures having a first lattice periodicity, P1, and a first nanostructure dimension, D1, selected according to the first stopband. The second nano-patterned optical filter can include a second lattice of nanostructures having a second lattice periodicity, P2, a second nanostructure dimension, D2, selected according to the second stopband. A first ratio D1/P1 and a second ratio D2/P2 can be within the range of 0.1 to 0.9 (e.g., 0.2 to 0.8, 0.25 to 0.75, 0.3 to 0.7, 0.4 to 0.6).

In certain examples, an angle between a surface normal of the first facet and a surface normal of the second facet is at least 15° (e.g., 20° or more, 25° or more, such as 30° or more, 35° or more, 40° or more, 45° or more, 50° or more).

In some examples, the microstructure includes more than two facets, each facet being non-parallel to the other facets, and wherein each facet includes a nano-patterned optical filter that is configured with a stopband that is different than stopbands of the other facets such that a unique color is emitted along the viewing angle of each of the facets.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Figure 1:
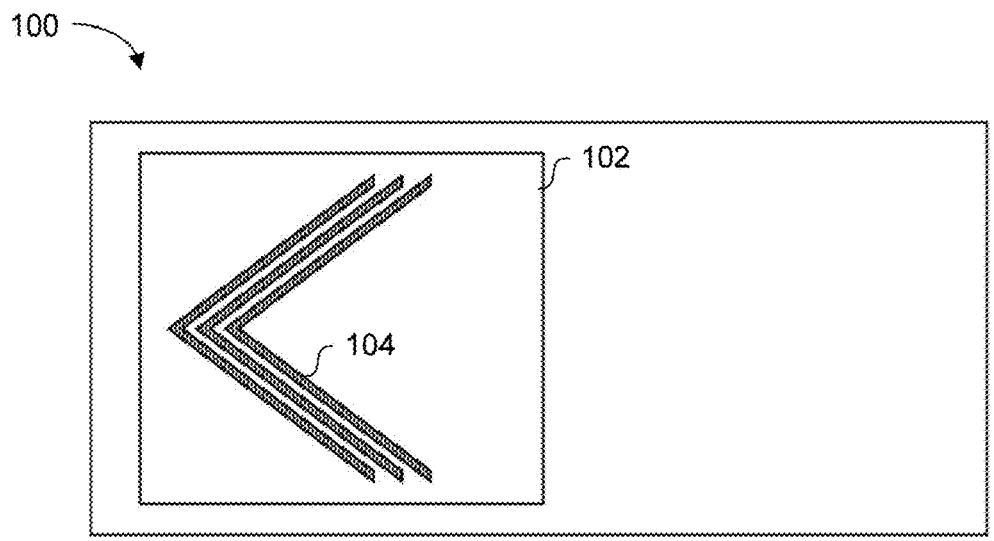
FIG. 1 is a diagrammatic representation of a secure document including an example security feature in accordance with many examples of the disclosure.

The disclosures of any patents, patent applications, and publications in their entireties are hereby incorporated by reference into this application in order to more fully describe the state of the art as known to those skilled therein as of the date of the invention described and claimed herein. The instant disclosure will govern in the instance that there is any inconsistency between the patents, patent applications, and publications and this disclosure.

Unless defined otherwise, all technical and scientific terms used herein have the same meaning as commonly understood by one of ordinary skill in the art to which this disclosure belongs. The initial definition provided for a group or term herein applies to that group or term throughout the present specification individually or as part of another group, unless otherwise indicated.

As used herein, the articles "a" and "an" refer to one or to more than one (i.e., to at least one) of the grammatical object of the article. By way of example, "an element" means one element or more than one element. Furthermore, use of the term "including" as well as other forms, such as "include," "includes," and "included," is not limiting. Use of the term "comprising" as well as other forms, such as "comprise," "comprises," and "comprised," is not limiting.

As used herein, the term "about" will be understood by persons of ordinary skill in the art and will vary to some extent on the context in which it is used. As used herein when referring to a measurable value such as an amount, a temporal duration, and the like, the term "about" is meant to encompass variations of ±20% or ±10%, including ±5%, ±1%, and ±0.1% from the specified value, as such variations are appropriate to perform the disclosed methods. The term "about" also encompasses the specified value(s) exactly.

As used herein, a "nano-pattern" refers to a pattern with features with at least one dimension sized less than 500 nm (e.g., 500 nm or less, 400 nm or less, 300 nm or less, 200 nm or less, 100 nm or less, e.g., 10 nm or more, 50 nm or more). Accordingly, a "nano-patterned surface" refers to a surface patterned with a nano-pattern. Examples of nano-patterned surfaces include surfaces with nanoposts and/or nanoholes therein. "Nano-patterned optical filters" refer to optical filters that include a nano-patterned surface. The features of a nano-patterned surface of a nano-patterned optical filter can include features that have a dimension smaller than an operative wavelength of the filter. A nano-patterned surface for use in an optical application, such as in nano-patterned optical filters, is an example of a metasurface.

The term "nanostructure" refers to a structure that has at least one dimension (e.g., an edge or a surface dimension) that is 500 nm or less in size.

The term "microstructure" refers to a structure having at least one dimension (e.g., an edge or a surface dimension) sized in a range from 1 micron to 1 mm.

For simplicity and clarity of illustration, reference numerals may be repeated among the figures to indicate corresponding or analogous elements. Numerous details are set forth to provide an understanding of the examples described herein. The examples may be practiced without these details. In other instances, well-known methods, procedures, and components have not been described in detail to avoid obscuring the examples described.

The present disclosure is directed to displays suitable for use in optical security features and in optically variable authentication security features enabled by optical filters that include a dielectric and/or metallic nano-patterned surface. The disclosed displays may be utilized in security features that provide color or image-switching ultraviolet (UV) fluorescence-based effects by integrating nano-patterned optical filters with microstructures that form facets on the pixels of the devices. Here, a display will generally include multiple pixels, e.g., arranged in an array. Each pixel includes a microstructured surface defining two or more facets (e.g., three, four, five, eight, 10 or more facets). At least one of the facets includes nano-patterned optical filter. The disclosure also describes a process for manufacturing nano-patterned optical filters by imprinting nano-patterns onto thermoplastic polymer or photopolymer resin and coating the imprinted resin with dielectric or metallic thin film in a vacuum coating chamber. The nano-patterned optical filter is designed to be transmissive to UV light and provides a band-stop at specific tailorable UV fluorescing wavelengths, such as for example, red and green. The color-switching effect is enabled by different wavelengths being filtered by differently structured nano-patterned optical filters sitting on distinctly angled facets of the pixels.

In comparison to multi-layer Fabry-Pérot interferometer-based color filters described previously, optical filters that include a nanopatterned surface, for example, a thin film dielectric surface of a HRI material over a LRI material may offer a superior filtering functionality by producing optical resonances at a specific wavelength. Such nano-patterned surfaces may be referred to herein as dielectric metasurfaces. The wavelength and bandwidth of such resonances depend on the geometrical arrangement of the lattice, shape of nanostructures, and the dispersion of materials used.

Similar to a dielectric nano-patterned surface, a two dimensional (2D) nano-patterned surface composed of metallic nanostructures, which may be referred to herein as plasmonic metasurfaces, can serve as a color filter in both transmission and reflection modes by exploiting subwavelength plasmonic resonances. The inevitably large intrinsic loss associated with the thin film metals presents challenges in obtaining either the desired reflection or the desired transmission magnitudes and broadens the resonance bandwidths which may adversely impacts the brightness and saturation of the colors obtained with such nanostructures. Typically, metals that are less absorptive at both visible wavelengths, e.g., wavelengths of 400 nm to 700 nm, and UV wavelengths, e.g., wavelengths of 350 nm to 400 nm, are preferred over metals that are more absorptive at these wavelengths.

Although the intrinsic material absorption may negatively affect the transmission and reflection characteristics in plasmonic metasurfaces, a negative refractive index of metallic thin films results in electromagnetic fields that are localized to nanometer scale, which may facilitate reducing the form factor of the filter. In addition, the refractive index contrast with the surrounding LRI material, such as for example, UV resin and adhesive with a refractive index of n~1.5, may result in high color contrast of the filters. Meaning the emitted light has darker colors, but more distinguishable colors compared to the light emitted from dielectric nano-patterned optical filters. Typically such color contrast attainable with thicker dielectric layers such as Si in dielectric nano-patterned optical filters. The thinner layers of metallic material utilized in plasmonic nano-patterned optical filters compared to HRI layer thickness in dielectric nano-patterned optical filters may be useful in certain applications because the nanoimprinting techniques utilized to construct thicker nano-patterned surfaces should replicate nanoposts/nanoholes with a higher aspect-ratio compared to thinner nano-patterned surfaces, which may result in manufacturing complexities for current nanoimprinting methods.

A 2D arrangement of dielectric nanostructures may offer more versatility in bandwidth compared to 2D arrangement of metallic nanostructures owing to the low loss of dielectrics. In contrast with plasmonic nanostructures where the electric dipoles dominantly control the spectral resonances, the magnetic dipole resonances mediated by Mie scattering may play an important role in dielectric nanostructures. Using structural parameters in dielectric nanostructures, the interplay between electric and magnetic dipoles may be tailored to feature a desired level of transmissivity or reflectivity with an adequately broadband bandwidth.

The refractive index contrast between the HRI dielectric lattice and the encapsulating LRI layers plays a role in the transmission and reflection properties of a nano-patterned optical filter. The index contrast impacts the confinement of fundamental electric and magnetic modes and the strength of their respective dipoles. The extinction coefficient of the HRI materials at the desired operating wavelength also influences the filtering characteristics of the device. In the particular case of a UV-fluorescing security feature, an HRI material with reasonably low extinction coefficient may be chosen in order to limit the undesirable absorption at both UV wavelengths required for excitation and the resulting visible wavelength(s) fluorescence.

In general, in any given example, materials with a HRI have a refractive index that is higher than a material with a LRI in that example. For example, an HRI material can have a refractive index that is about 0.1 or more (e.g., about 0.2 or more, about 0.3 or more) higher than a LRI material. In some examples, a LRI material has a refractive index in a range from 1.3 to 1.5 (e.g., about 1.3, about 1.35, about 1.4, about 1.45, about 1.5). In certain examples, a HRI material has a refractive index in a range from 1.6 to 1.9 (e.g., about 1.6, about 1.65. about 1.7, about 1.75, about 1.8, about 1.85, about 1.9). For example, certain LRI resins and HRI resins can have a refractive index in these respective ranges. In some cases, HRI materials can have a refractive index of greater than 1.9 (e.g., about 1.95, about 2, about 2.05, about 2.1). For instance, certain composite materials (e.g., resins infused with nanoparticles, e.g., $TiO_2$ nanoparticles) can have a refractive index greater than 1.9.

In some examples, LRI and/or HRI materials are used to form dielectric functionalizing layers, e.g., coated on a resin. In such cases, a HRI material can have a refractive index of 2 or more (e.g., about 2.05, about 2.1, about 2.15, about 2.2, about 2.25, about 2.3, about 2.35). The HRI material can have a refractive index of less than 2.4. Exemplary materials include Si or $TiO_2$. LRI materials for such layers can have a refractive index in a range from 1.5 to less than 2 (e.g., about 1.55, about 1.6, about 1.65, about 1.7, about 1.75, about 1.8, about 1.85, about 1.9, about 1.95).

To the extent the refractive index of a material varies depending on wavelength, the refractive index is considered to be the refractive index at an operative wavelength of the device.

Figure 2:
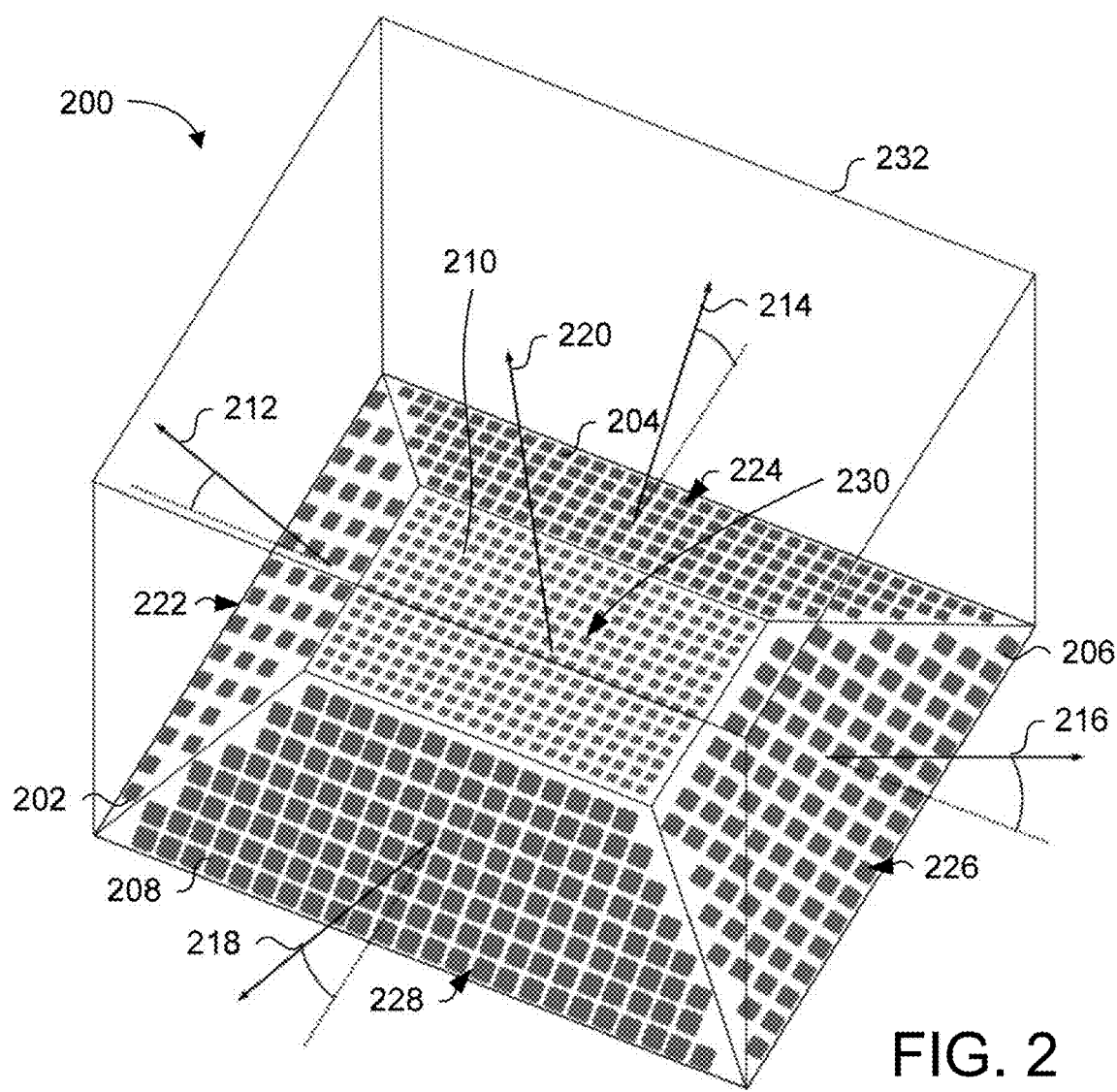
FIG. 2 is a diagrammatic representation of an example of a micropixel in perspective view in accordance with many examples of the disclosure.

A document 100 that includes a security feature 102 is shown in FIG. 1. The document 100 may be any document for which authenticity or security through, for example, inhibiting counterfeiting is desired. One example of such a document is a banknote. The security feature 102 is comprises of a great many microstructures, for example microstructure pixels as shown in FIG. 2. Reference numeral 104 represents the image of the security feature 102. The security feature 102 may be configured to provide a visual effect in that, for example, as the angle between a viewer's eye and the surface of the security feature, referred to as the viewing angle, changes, the image 104 observed by the viewer also changes. These visual effects may include one or more the image appearing three dimensional (3D), an animated image, a color switching effect, or a color shifting effect.

In the examples of the present disclosure, a security feature, which may also be referred to as an authentication display device, is described that is configured to displaying one or more of color-switching effects, image switching effects, or both color switching and image switching effects, using a combination of microstructures and nano-patterned optical filters. The optical filters may include dielectric metasurfaces, plasmonic metasurfaces, or a combination of dielectric and plasmonic metasurfaces.

To provide the color switching and image switching effects, the security feature described in the present disclosure includes pixels that each include a multi-faceted microstructure. Each multi-faceted microstructure is populated with dielectric nano-patterned optical filters or plasmonic nano-patterned optical filters.

The dielectric nano-patterned optical filters are 2D lattice (e.g., periodic lattice) of HRI dielectric nanoholes or nanoscatterers encapsulated in LRI material. The plasmonic nano-patterned optical filters are 2D lattice (e.g., periodic lattice) of metallic nanoholes or nanoscatterers encapsulated in LRI material.

The nano-patterned optical filters are designed to block the transmission of a specific band of wavelengths while remaining transparent for other visible colors. When incorporated into a security feature having with UV-ink materials, which emit visible light when illuminated by UV radiation, the nano-patterned optical filter can be designed to selectively transmit only the desired range of emitted wavelengths. The transmissivity and bandwidth of the nano-patterned optical filter should correspond to the fluorescence intensity and linewidth of the pigments included in the UV-ink.

To induce a color-switch effect, the nano-patterned optical filters are provided on facets of an optically transparent microstructure made of LRI material. For example, as explained below, the nano-patterned optical filters can be provided by directly patterning a surface of a facet and/or depositing one or more layers onto a surface of the facet. In some cases, one or more layers deposited on a surface of the facet is patterned, e.g., separately or in addition to patterning the facet surface itself. The microstructures are configured in the form of a periodic lattice of micro-pixels. Each micro-pixel embeds at least two facets having non-parallel surface normals, each facet hosting a single nano-patterned optical filter.

An example microstructure pixel 200 of a security feature is shown in FIG. 2. The example microstructure pixel 200 has five facets 202, 204, 206, 208, 210. The facets 202, 204, 206, 208, 210 may be formed of a LRI index material, such as UV or thermal curable resin that is substantially transparent to both UV and visible light.

Each facet 202, 204, 206, 208, 210 has a respective surface normal indicated by arrows 212, 214, 216, 218, 220. In the example pixel 200 show in FIG. 2, each surface normal of the facet 202, 204, 206, 208, 210 is non-parallel to the other surface normal of the other facets facet 202, 204, 206, 208, 210.

In some examples, some of the facets may have a surface normal that is parallel to the surface normal of one or more of the facets of the pixel and that is non-parallel to the surface normal of one or more of the other facets of the pixel.

It may be assumed that the surface normals of the facets 202, 204, 206, 208, 210 are angled differently enough such that $\theta_{ab}=\cos^{-1}(N_a \cdot N_b)$, with $\theta_{ab}>15°$ and preferably $\theta_{ab}>25°$, where $N_a$ is the surface normal of a first facet, a, and $N_b$ is surface normal of a second facet, b, so that a distinguishable fluorescence color is displayed to the user at each corresponding viewing angle. The tilt angle of the facet with respect to planar surface should also be limited such that the transmitted beam does not become bound in the LRI resin layer and LRI capping protective layers as a result of total internal reflection at the boundary of this layer and air.

As described in more details below, the substrate (not shown in FIG. 2) of the pixel 200 underneath the facet material may include UV ink that fluoresces different colors of visible light when irradiated by UV light. Generally, fluorescence from the UV ink is emitted omnidirectionally (e.g., in an isotropic distribution or in an anisotropic distribution, such as a Lambertian distribution). While emission from the UV ink is depicted by an arrow in the figures, it is to be understood that emission will be in a distribution of directions including the direction of the arrow. Other forms of luminescent light emission besides fluorescence are possible. For example, in some examples, materials capable of chemi-luminescence, electro-luminescence, mechano-luminescence, radio-luminescence, and/or thermos-luminescence can be incorporated into the substrate.

Each facet 202, 204, 206, 208, 210 includes a respective lattice of nanostructures 222, 224, 226, 228, 230 that form a nano-patterned optical filter on each of the facet 202, 204, 206, 208, 210. The lattices of nanostructures 222, 224, 226, 228, 230 may be configured such that each corresponding nano-patterned optical filter filters a different wavelengths of the fluorescent light emitted from the substrate such that a different color is viewable at each viewing angle corresponding to the different facets 202, 204, 206, 208, 210. The viewing angle of each of the facets 202, 204, 206, 208, 210 is approximately along the surface normal of the facet 202, 204, 206, 208, 210.

The pixel 200 includes a top layer 232, or a capping layer, of LRI material such that the lattices of nanostructures 222, 224, 226, 228, 230 forming the nano-patterned optical filters are embedded in the LRI material.

The stopband of each nano-patterned optical filter may be tailored by varying the structural properties of the corresponding lattice of nanostructures 222, 224, 226, 228, 230. The properties may include the lattice periodicity of the nanostructures, the refractive indices of the materials used to form the nanostructures, the shape and dimensions of the nanostructures. By selecting these parameters for the lattice of nanostructures 222, 224, 226, 228, 230, the location of the stopband may be fine-tuned to one distinct fluorescence wavelength of the fluorescent light and therefore induce a color-switch effect when the observer's perspective changes between the viewing angles of the facets.

A security feature is formed from a number of pixels all having similar facet structures such that, when the security feature is viewed by an observer from a particular viewing angle, an image is formed from the light emitted by all of the facets of the different pixels that having viewing angles corresponding to the viewing angle of the observer.

Although the example pixel 200 shown in FIG. 2 includes five facets 202, 204, 206, 208, 210, in general each pixel of a security may include any number of facets provided that at least two facets have non-parallel surface normals to provide color switching or image switching effects. The number of facets may depend on, for example, the desired number of displayed perspectives, or the number of available distinct fluorescence peaks emitted by the underlying pigments in the UV fluorescing layer, or a combination of both. It is noted that multiple UV pigments (e.g., red, green and blue fluorescing pigments) may be combined into a single ink and printed as a single layer. This combination of pigments in a single layer may add to the security aspect as the UV-fluorescing ink in this case will emit a combination of wavelengths (colors) all at once, such that the individual colors will not be seen without the accompanying filters.

Figure 3:
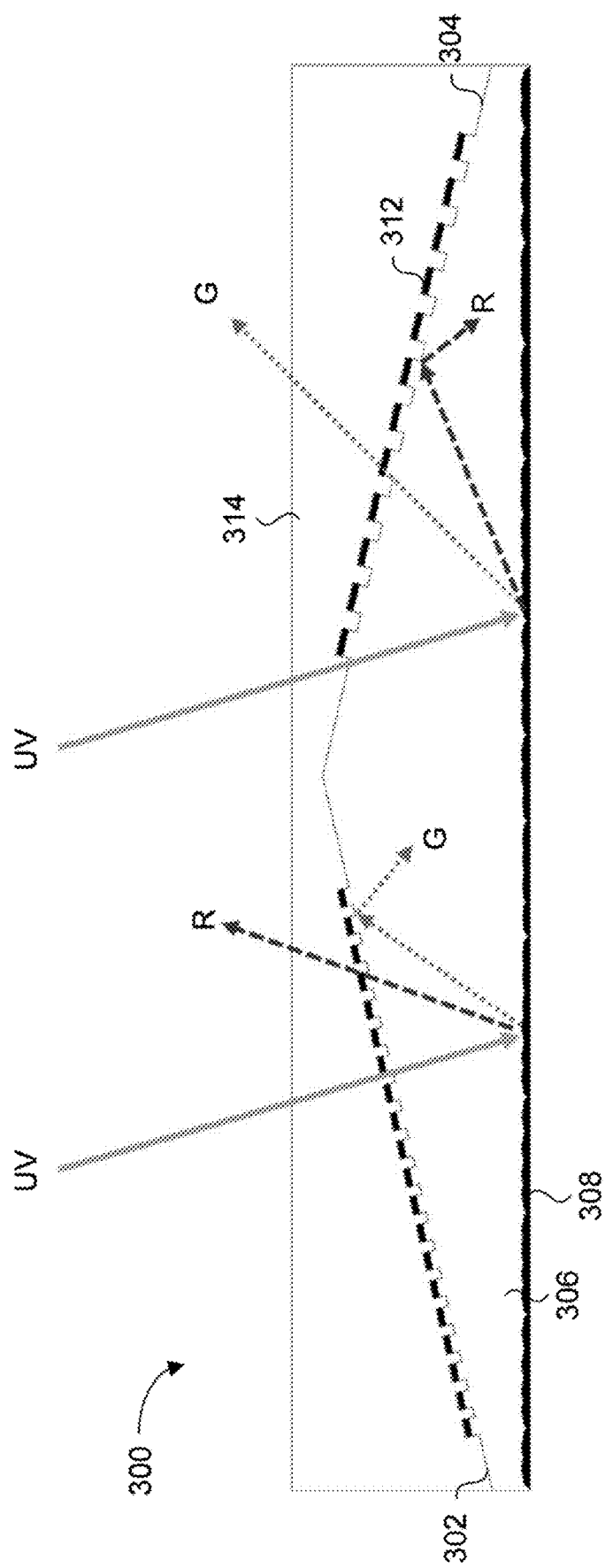
FIG. 3 is a diagrammatic representation of an example micropixel in cross-section in accordance with many examples of the disclosure.

A cross sectional view of another example pixel 300 is shown in FIG. 3 to illustrate how the color switching or image switching effect is provided. The example pixel 300 includes a first facet 302 and a second facet 304 formed from a LRI material 306 on substrate 308. The LRI material may be attached to the substrate by, for example, an adhesive. The LRI material (for example, resin) is substantially transparent to red light, to green light, and to UV radiation. In the example shown, the substrate includes a UV ink that includes red (R) and green (G) fluorescing pigment.

The first facet 302 includes a nano-patterned optical filter 310 configured to filter out green light, and the second facet 304 includes a nano-patterned optical filter 312 configured to filter out red light. The pixel 300 includes a top layer 314 of LRI material such that the nano-patterned optical filters 310, 312 are embedded within the LRI material.

The nano-patterned optical filters 310, 312 may each be any type of nano-patterned optical filter, including dielectric or plasmonic nano-patterned optical filters. The nano-patterned optical filters 310, 312 are formed of nanostructures. In the example shown, but nano-patterned optical filters 310, 312 are formed of nanoscatterers, however in other examples the nano-patterned optical filters of each facets may be formed of either nanoscatterers or nanoholes, as described in more details below.

When UV light irradiating the pixel passes through the top layer 314, nano-patterned optical filters 310, 312 and the LRI material 306 forming the facets to shine onto the UV ink on the substrate 308. The UV light causes the red and green pigment to fluoresce red (R) and green (G) light. The green (G) light is filtered by the nano-patterned optical filter 310 of the first facet 302, whereas the red (R) light passes through such that an observer viewing the pixel 300 along the viewing angle of the first facet 302 would see only red light. Conversely, the red (R) light is filtered by the nano-patterned optical filter 312 of the second facet 304, whereas the green (G) light passes through such that an observer viewing the pixel along the viewing angle of the second facet 304 would see only green light. In this way, as the observer moves from the viewing angle of the first facet 302 to the viewing of the second facet 304, the observer will see a color switch effect from red to green.

As discussed briefly, the nanostructures forming the nano-patterned optical filter may be formed of scatterers of a HRI or metallic material, or of nanoholes in a thin sheet of HRI or metallic material, or a combination of scatterers and nanoholes. The scatterers or the perforated sheet may be sandwiched between layers of the LRI material, as described above.

Figure 4A:
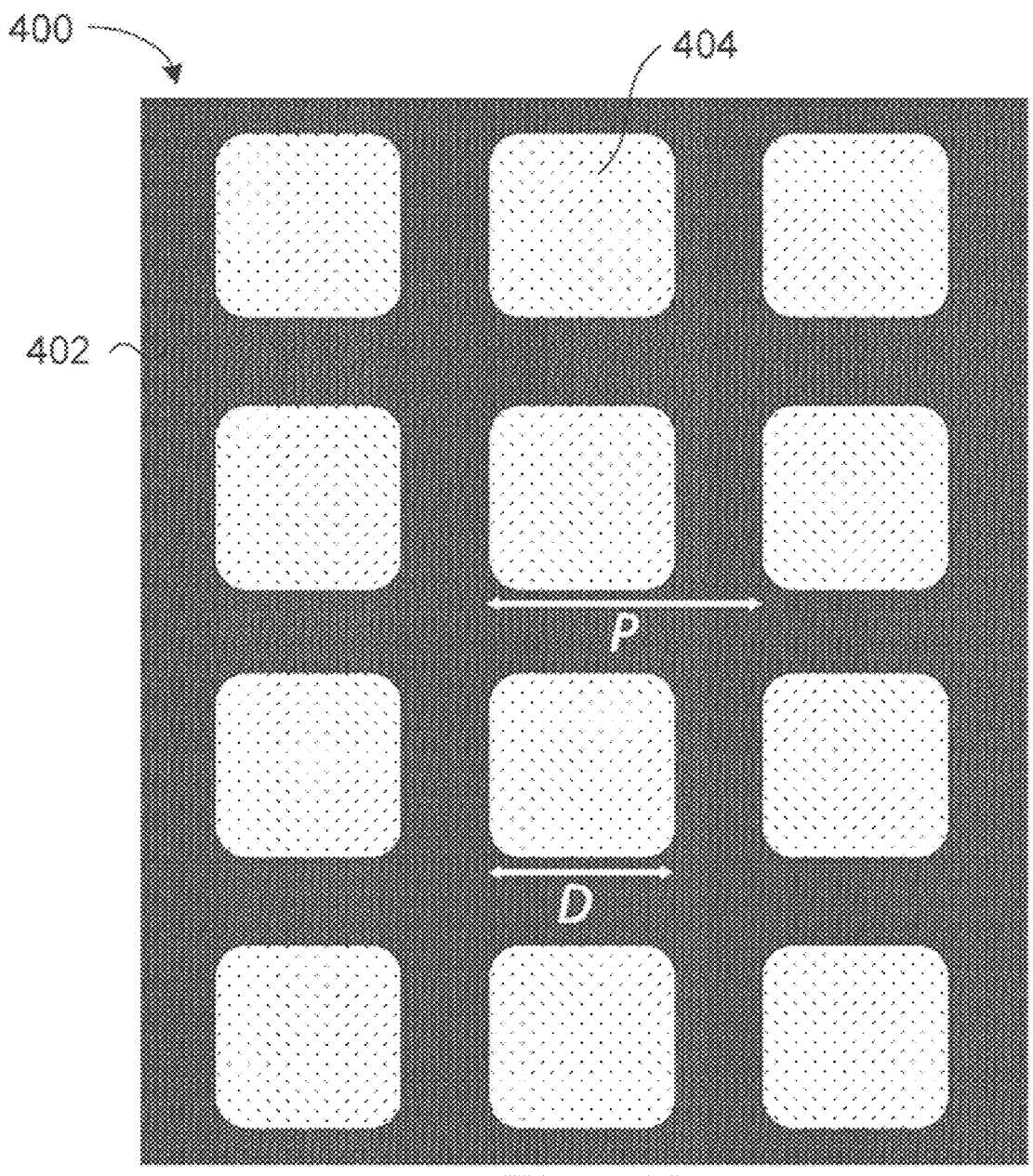
FIG. 4A is a diagrammatic representation of an example nano-patterned optical filter in top view in accordance with many examples of the disclosure.
Figure 4B:
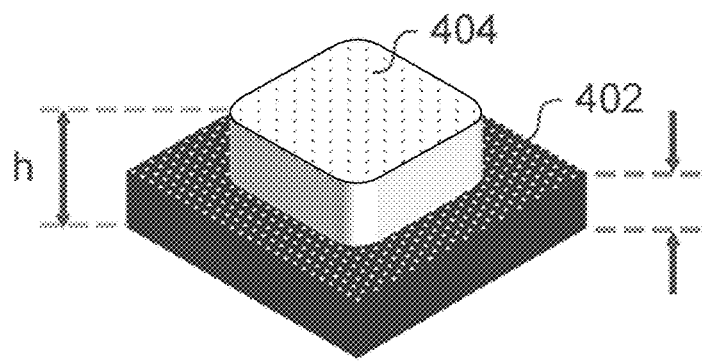
FIG. 4B is a diagrammatic representation, in perspective view, a portion of the example nano-patterned optical filter shown in FIG. 4A.

An example of a nano-patterned optical filter 400 is shown in FIGS. 4A and 4B, including nanostructures formed of square shaped nanoholes in a sheet 402 of an HRI or a metallic material, with the nanoholes filled with a LRI material 404.

In the case of the nanoholes in FIGS. 4A and 4B, the material 402 (for example, metal) is of the shape illustrated in FIG. 4A in that it is a sheet that has holes. The holes in the plane of the sheet are filled with material 404 (for example, resin), and this entire structure is also completely covered with an additional layer of the material 404 (for example, resin).

Figure 5A:
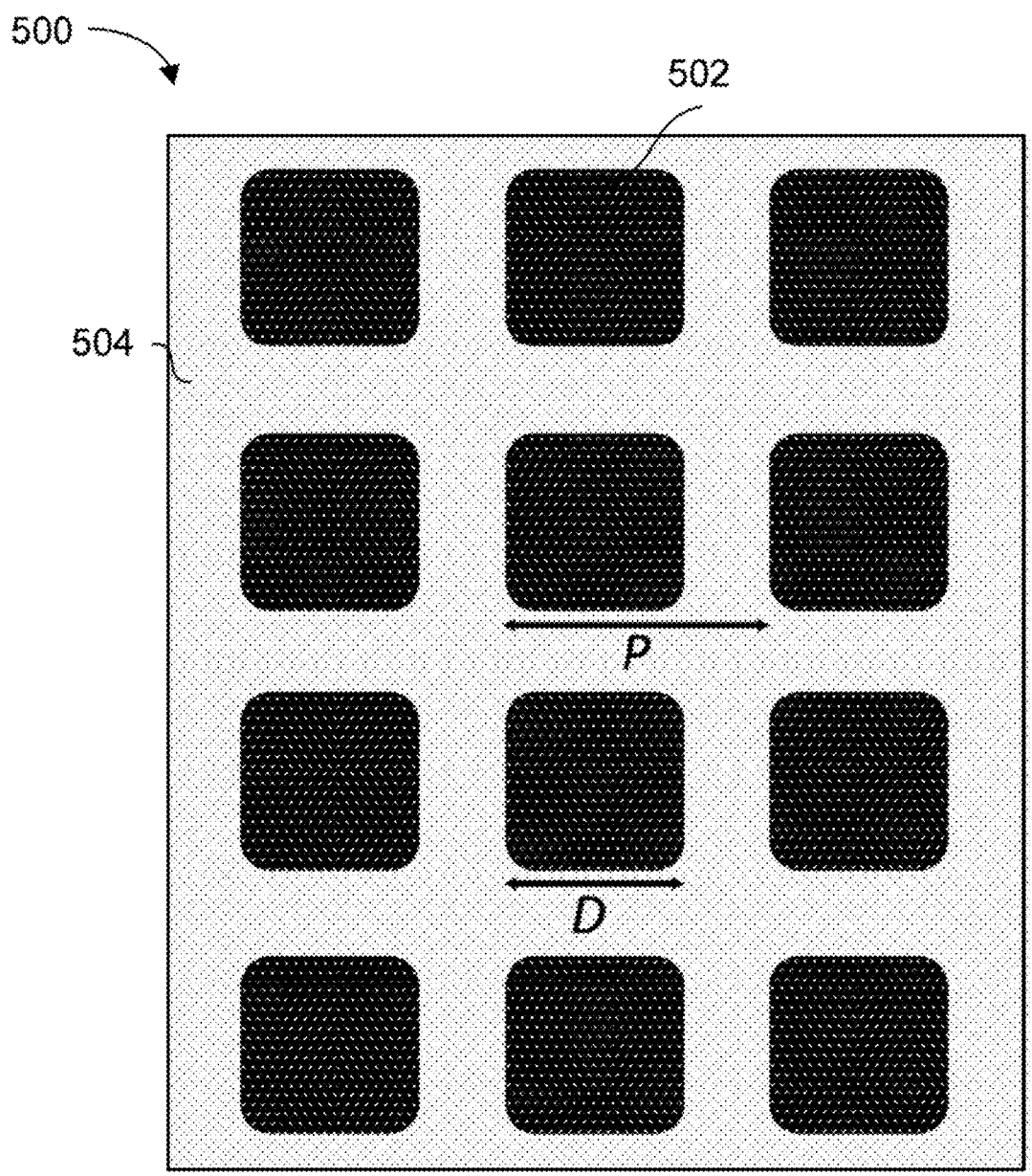
FIG. 5A is a diagrammatic representation of another example nano-patterned optical filter in top view in accordance with many examples of the disclosure.
Figure 5B:
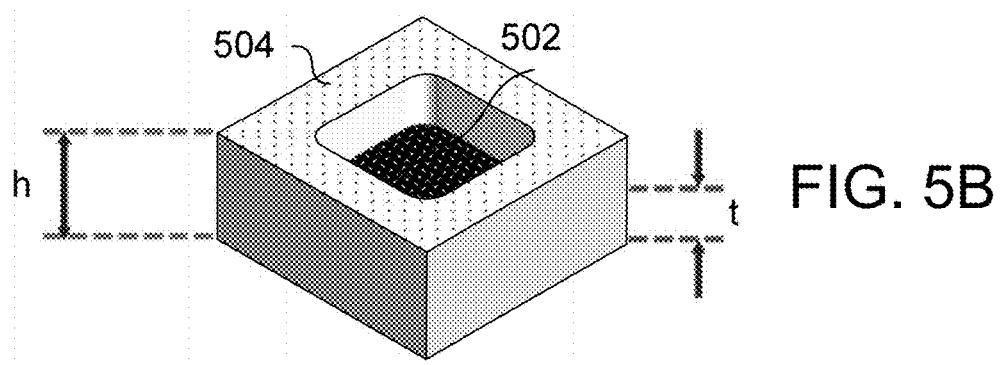
FIG. 5B is a diagrammatic representation, in perspective view, of a portion of the example nano-patterned optical filter shown in FIG. 5A.

An example of a nano-patterned optical filter 500 is shown in FIGS. 5A and 5B, including nanostructures (nano-posts) formed of square shaped scatterers 502 in a background of an LRI material 504. In the case of the nanoposts in FIGS. 5A and 5B, the material 504 (for example, resin) is in the shape of a sheet that has holes. Each hole is filled with an amount of the material 502 (for example, metal) to form a nanopost. This entire structure including the sheet of material 504 and the array of nanoposts is also completely covered with an additional layer of the material 504 (for example, resin).

Although the nanoholes in the example shown in FIGS. 4A and 4B, and the scatterers in the example shown in FIGS. 5A and 5B are square-shaped, different shapes may be fabricated in other examples. The shape may be chosen depending on, for example, the required modal dispersion and fabrication feasibility.

The modal dispersion of the perforated sheet 402 and lattice of scatterers 502 predominantly depends on the lattice periodicity, P, the size of nanoholes/scatterers, D, and the thickness of the HRI or metallic material, t.

By properly selecting D/P ratio of the nano-patterned optical filter, which relates to the filling factor of HRI or metallic material in a unit cell of nano-patterned optical filter lattice, the filter's transmission stopband may be configured to lie in the visible spectrum.

In dielectric nano-patterned optical filters, in which the perforated sheet 402 or the scatterers are formed of a HRI material, the D/P ratio may also impact the linewidth of the stopband, depending on the thickness and refractive index of the HRI thin film in dielectric nano-patterned optical filters. The transmission dip of the nanoscatterer lattice is predominantly determined by the electric dipole resonance in the HRI scatterers for $t<\lambda_0/2n_{HRI}$, where $\lambda_0$ is the vacuum wavelength of light and $n_{HRI}$ is the refractive index of the HRI material. Here, the magnetic dipole either does not exist or plays a weaker role in transmission resonances. In this regime, for a constant P, increasing D will relax the confinement of the fundamental electric dipole mode in HRI scatterers resulting in a redshift of the transmission dip. Increasing P will redshift the transmission dip. Conversely, for a constant P, increasing D will tighten the confinement of the fundamental electric dipole mode in perforated HRI sheets resulting in a blueshift of the transmission dip.

In plasmonic nano-patterned optical filters, in which the perforated sheet 402 or the scatterers 502 are formed of a metallic layer, resonances are originated from the individual localized surface plasmon resonances (LSPR) in the metallic layer and their coupling. This is in contrast to dielectric nano-patterned optical filters, in which resonances are due to Mie scattering as described previously.

Owing to the high quality-factor (Q-factor) of LSPR optical modes, thin, e.g., t<40 nm, metallic layers may be utilized in the perforated sheet 402 or the scatterers 502 to produce plasmonic nano-patterned optical filters with desired transmission characteristics. LSPR and their spectral properties are tied to the dispersion characteristics of the metallic layer and the modal dispersion of the nano-patterned lattice structure, and are controlled by P, D, the thickness of the LRI layer, h, and the metal lawyer thickness, t.

In an example, the above structural parameters of plasmonic nano-patterned optical filters utilizing an aluminum metallic layer encapsulated in UV curable resin was investigated using finite-difference time-domain (FDTD) modeling. Aluminum is a commonly used metallic layer in the banknote and brand protection security feature industry, owing to its abundance, material dispersion properties and robustness against deteriorating oxidation. An aluminum sheet perforated with nanoholes, similar to sheet 402, transmits the light only at about the resonance frequency which redshifts with the periodicity, P. Increasing D also redshifts the transmission peak, boosts the transmission amplitude and broadens the passband. A lattice of aluminum scatterers, similar to scatterers 502, is transmissive for the visible light except about the resonance frequency. P and D both play a weak role in shifting the transmission dip. Increasing P may slightly narrow the stopband, whereas increasing D may broaden the stopband. Adjusting the thickness, t, of the metallic layer may be less effective than adjusting P and D in shifting the resonance frequency and may only slightly impacts the bandwidth. These general design guidelines are drawn based on the standard topologies shown in FIGS. 4A, 4B, 5A, and 5B and might not be generally applicable for examples with other forms of nanohole/scatterer geometry, structural irregularities, and also other type of metals with different dispersion properties.

In some instances, the D/P ratio of the nano-patterned optical filters can be in a range of 0.1 to 0.9 (e.g., about 0.2 or more, about 0.3 or more, about 0.4 or more, about 0.5 or more, about 0.6 or more, about 0.7 or more, about 0.8). For example, such D/P ratios of filters may be more amenable to manufacturing. Nano-patterned optical filter structures, such as those shown in FIGS. 4A, 4B, 5A, and 5B, may be constructed by imprinting the nanostructures of the nano-patterned optical filter into the UV or thermal curable resin using a stamp. The stamp may be made using a lithography method, thus the lithography resolution in either the stamp fabrication step or in the imprinting step may become challenging when D/P>0.75 or D/P<0.25. Thus, in certain circumstances it may be desirable that the ratio D/P be in the range from about 0.25 to about 0.75.

FDTD electromagnetic simulations of dielectric nano-patterned optical filters indicate that the lattice of HRI scatterers may offer better wavelength selectivity than the perforated HRI sheet of nanoholes within the 0.25<D/

P<0.75 range in that a lattice of HRI scatterers may offer a broader bandwidth and larger suppression of transmission in the stopband and provide a higher level of transmissivity within their respective passband than the perforated HRI sheet of nanoholes.

Manufacturing nano-patterned optical filters as described herein may be performed using physical vapor deposition of HRI or metallic thin films onto a UV or thermal resin cast or embossed substrate. Depending on the deposition method, the thin film profile may end up with either of the geometries shown in the cross-sectional views shown in FIGS. 6 and 7.

Figure 6:
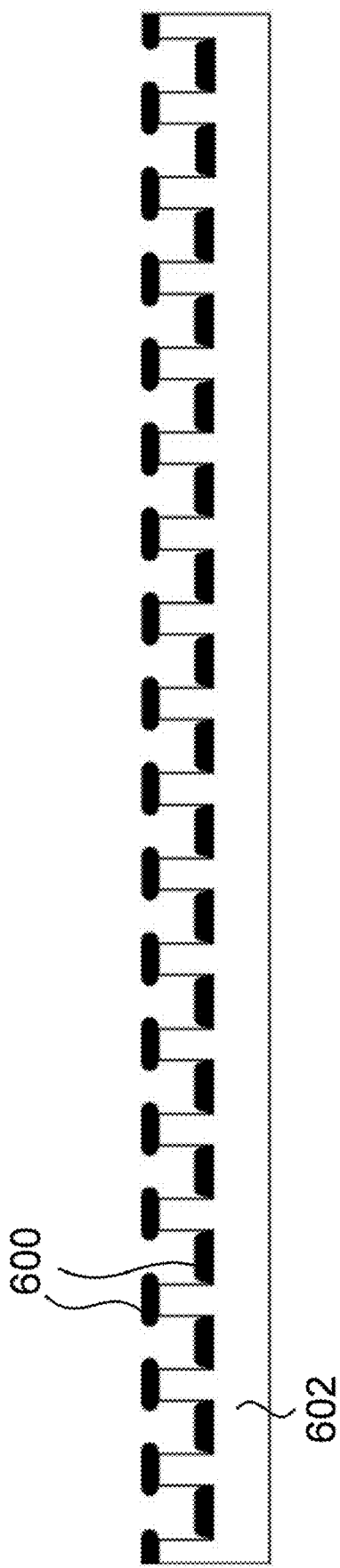
FIG. 6 is a diagrammatic representation, in cross-section, of an example stage of a manufacturing process of a nano-patterned optical filter after vapor deposition in accordance with many examples of the disclosure.

A thin film 600 is deposited on the top of, and in the troughs between, nanostructures of the LRI layer 602, but not on the sidewalls of the structures, as shown in FIG. 6. The thin film deposited in the troughs forms a perforated sheet, and the film deposited on the tops of the structures form scatterers. This configuration is described herein as a "Type 1 profile". Type 1 profile is considered a combination of a perforated sheet and a lattice of HRI scatterers and can be separated into those configurations using a de-capping process of nanostructures described below with reference to FIGS. 8A to 8D. The Type 1 geometry shown in FIG. 6 may be formed when the deposition process benefits from a good directionality, such as in, for example, thermal or electron beam evaporation, thus the sidewalls of the meta-structures are not covered with thin film material.

Figure 7:
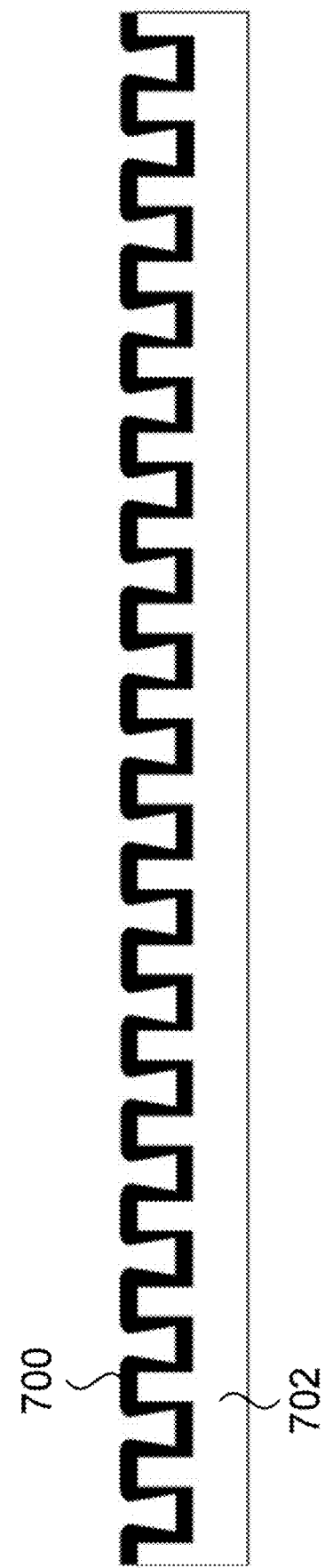
FIG. 7 is a diagrammatic representation, in cross-section, of another example stage of a manufacturing process of a nano-patterned optical filter after vapor deposition in accordance with many examples of the disclosure.

A thin film 700 is deposited on the sidewalls of the nanostructures of the LRI layer 702 in addition to the tops and the troughs, as shown in FIG. 7. This configuration is described herein as a "Type 2 profile". Type 2 profile may be formed in, for example, a plasma-mediated sputtering process where the thin film profile is conformal or nearly conformal and suffers from poor directionality compared to thermal or electron beam evaporation.

A de-capping process for manufacturing nano-patterned optical filters is described with reference to FIGS. 8A to 8D. The feasibility of the de-capping process described in FIGS. 8A to 8D relies on the profile of the thin film to be non-conformal to the nanostructures. The unmasked sidewalls in Type 1 profiles facilitates the de-capping process described below. Step coverage of the nanostructure sidewalls in Type 2 profile, however, prohibits an efficient physical separation of the perforated sheet and the lattice of scatterers, and therefore optical separation is not desirable when manufacturing nano-patterned optical filters utilizing a de-capping process.

The general de-capping process utilized here has been described in International Patent Publication WO2018201248, which is incorporated herein by reference. Only the relevant steps required to achieve a lattice of scatterers and a perforated sheet of nanoholes as previously discussed are described here.

Figure 8A:
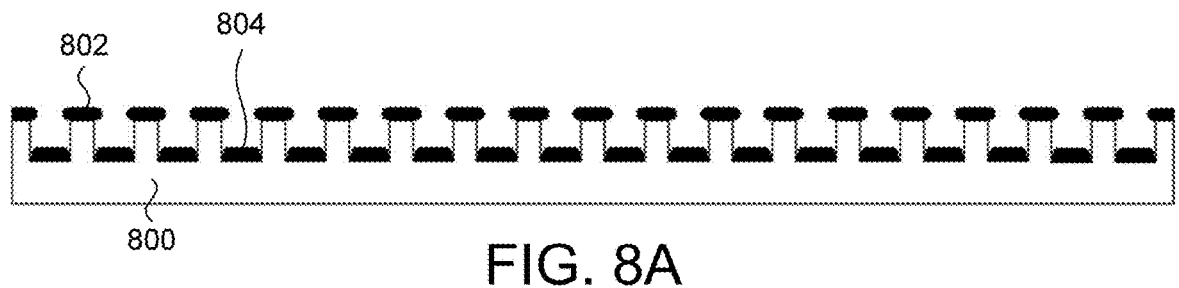
FIG. 8A is a diagrammatic representation, in cross-section, illustrating a step in an example process for manufacturing a nano-patterned optical filter in accordance with many examples of the disclosure.

In the de-capping process, a certain area populated by nanostructures is first copied from a hard stamp or mold onto a UV or thermal curable resin 800. The curable resin is cured and hardened. The surface of the nanostructures composed of an arrangement of nanoholes or nanoposts, or scatterers, or a combination of the two is then coated with one or multiple thin layers of deposition material, such as metals or oxides, as shown in FIG. 8A.

The thin film material can particularly be an HRI material or a metallic material for optical filtering applications. At this stage, the surface incorporates a lattice of scatterers 802, on the tops of the nanostructures of the resin 800, and a perforated sheet of nanoholes 804, formed in the troughs between nanostructures of the resin 800.

Figure 8B:
FIG. 8B is a diagrammatic representation, in cross-section, illustrating another step in the example process for manufacturing a nano-patterned optical filter of FIG. 8A in accordance with many examples of the disclosure.

Next, a capping layer 806 of UV or thermal curable resin covers the top surface of the meta-structures with poor adhesion to the underlying thin film layer, as shown in FIG. 8B. The de-capping resin can then be cured to encapsulate the lattice of scatterers.

Figure 8C:
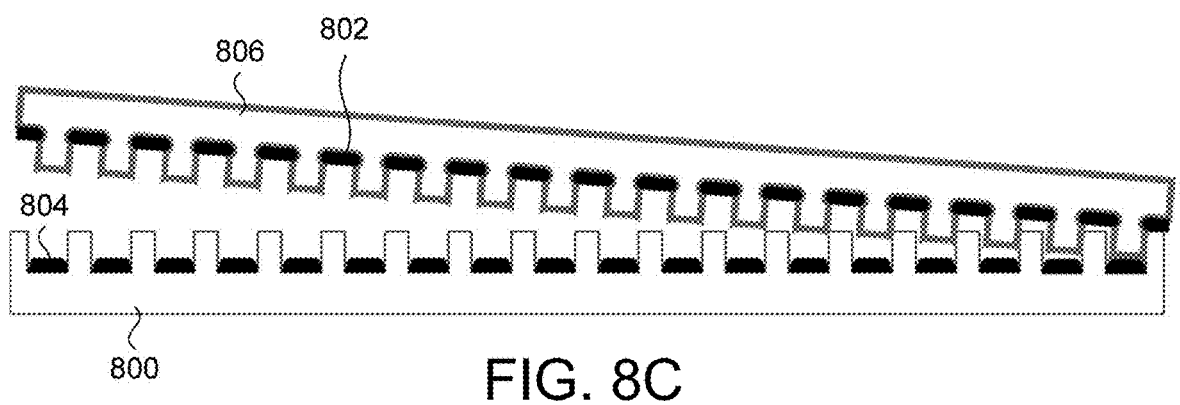
FIG. 8C is a diagrammatic representation, in cross-section, illustrating another step in the example process for manufacturing a nano-patterned optical filter of FIG. 8A in accordance with many examples of the disclosure.
Figure 8D:
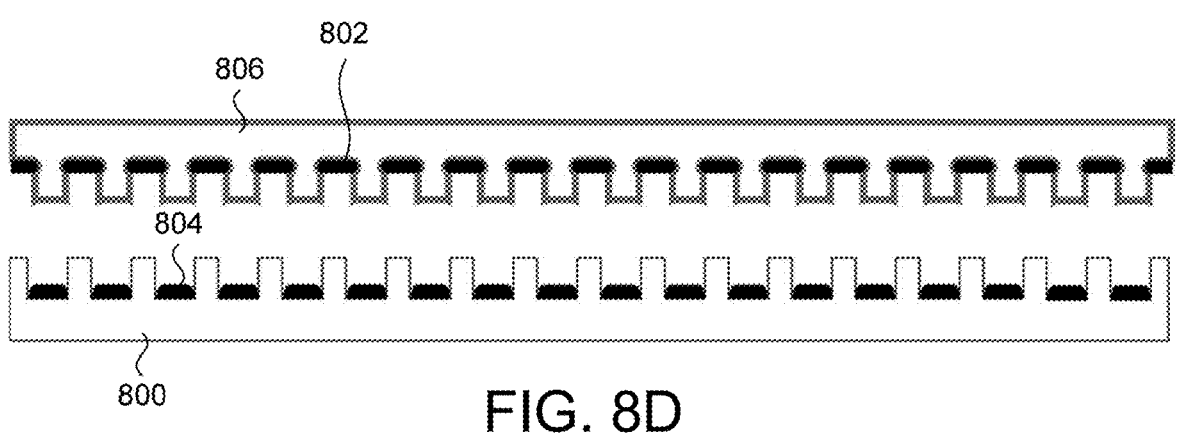
FIG. 8D is a diagrammatic representation, in cross-section, illustrating another step in the example process for manufacturing a nano-patterned optical filter of FIG. 8A in accordance with many examples of the disclosure.

In the next step, the hardened de-capping layer 804 along with the lattice of scatterers is mechanically, or otherwise, detached as shown in FIG. 8C, resulting in two separate devices, a lattice of scatterers 802 on the resin layer 806 and perforated sheet 804 of nanoholes on the resin layer 800.

The thickness of the thin film is, in some examples, made smaller than the depth of nanostructures of the resin 800 to facilitate the encapsulation process. To facilitate the de-capping mechanism, the thickness of the scatterers 802 may be thin enough so that the detaching force overcomes the adhesion forces between the lattice and the underlying structures of the resin 800. Also, the chance of failure in the de-capping process may directly relate to the density of pillar structures and the D/P ratio because the inter-pillar spacing limits how the de-capping resin fills into the gaps and encapsulates the scatterers.

As described previously the nano-patterned optical filters on different facets may be formed of perforated sheets, or a combination of scatterers and perforated sheets such that some of the facets include nano-patterned optical filters composed of perforated sheets and other facets include nano-patterned optical filters that include scatterers.

Figure 9:
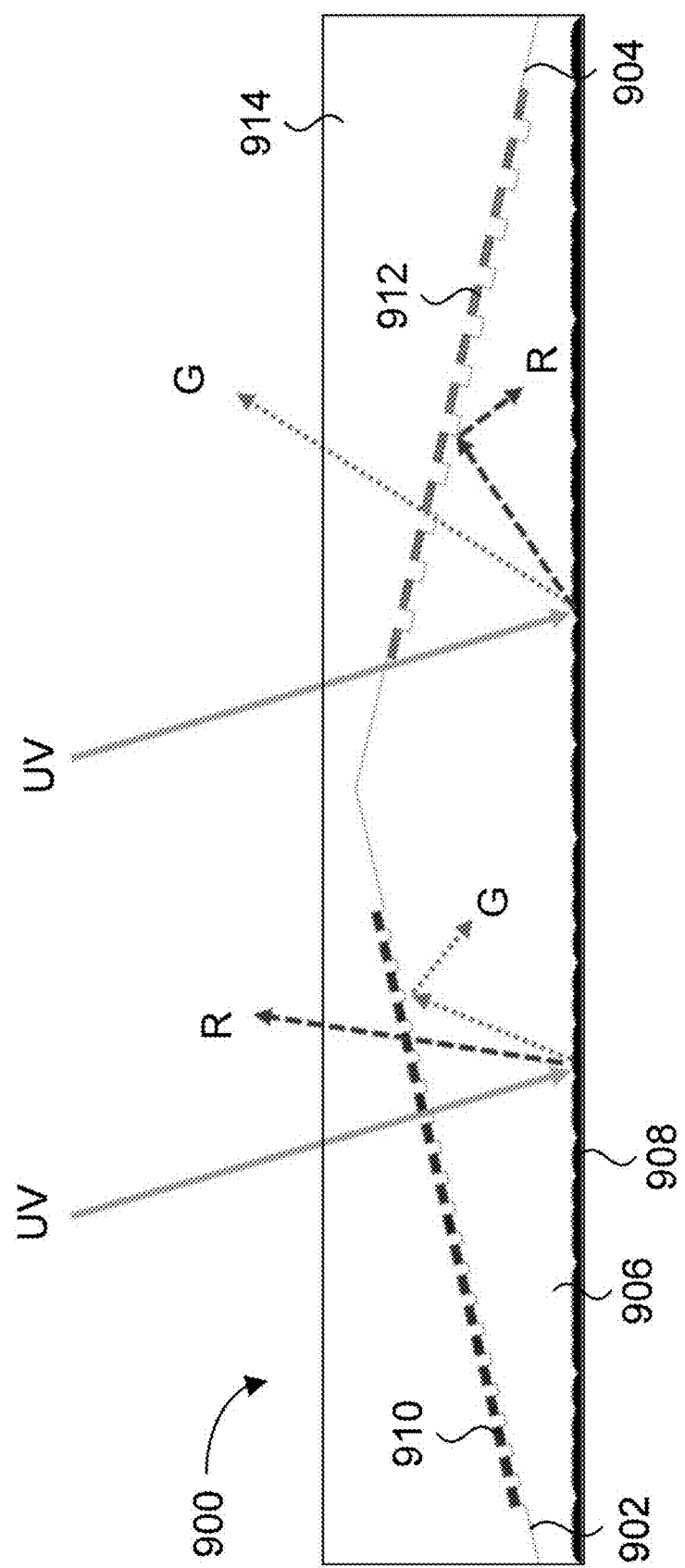
FIG. 9 is a diagrammatic representation of a cross-sectional view of another example micropixel in accordance with many examples of the disclosure.

A cross-sectional view of an example pixel 900 is shown in FIG. 9, in which a first facet 902 includes a nano-patterned optical filter 910 including a lattice of scatterers, and a second facet 904 that includes a nano-patterned optical filter 912 that includes a perforated sheet having nanoholes. Similar to the example pixel 300 described above with reference to FIG. 3, pixel 900 includes a layer 906 of LRI material formed on a substrate 908 that includes a UV ink having fluorescing red and green pigment, and a top layer 914 of a LRI material such that the nano-patterned optical filters 910, 912 are embedded in the LRI material. The LRI material (for example, resin) is substantially transparent to red light, to green light, and to UV radiation. As with the pixel 300, nano-patterned optical filter 910 is configured to inhibit green (G) light from passing through the first facet 902 such that an observer viewing the pixel 900 along a viewing angle corresponding to the first facet 902 will observer red (R) light. The nano-patterned optical filter 912 is configured to inhibit red (R) light from passing through the second facet 904 such that an observer viewing the pixel 900 along a viewing angle corresponding to the second facet 904 will observer green (G) light.

In general, inhibition of a color of light from passage through a facet does not imply all the light of that color is blocked. Rather, sufficient light is blocked relative to uninhibited light so that the facet takes on the hue of the uninhibited light. In some examples, a nano-patterned optical filter will inhibit passage of light in band of wavelengths such that 20% of less (e.g., about 15% or less, about 10% or less, about 5% or less, such as about 2% or more, about 1% or more) of the light incident on the filter at each wavelength in the band is transmitted by the filter. Transmission of light through a filter for wavelengths outside of the stopband can be 60% or more (e.g., about 65% or more, about 70% or more, about 75% or more, about 80% or more, about 90% or more, such as about 99% or less, about 95% or less) at each wavelength in a passband. The bandwidth of a stopband can, in general, be 80 nm or less (e.g., about 70 nm or less, about 60 nm or less, about 50 nm or less, about 40 nm or less, about 30 nm or less).

Generally, the characteristics (e.g., stopband width and wavelength range) of a nano-patterned optical filter depends on the composition and lattice structure of the nanostructure. Accordingly, these parameters can be used as engineering levers to tailor the performance of a nano-patterned optical filter depending on the implementation. Typically, the stopband characteristics of the nano-patterned optical filter is selected based on the emission wavelengths of the UV ink so that the stopband wavelengths correspond to a subset of the emission wavelengths. For example, a nano-patterned optical filter may be broadband (e.g., >about 60 nm, e.g., with no sharp cut offs), but the fluorescence of the underlaid red pigment in the UV ink may be relatively narrowband (e.g., about 20 nm) and separated from a green pigment (e.g., by about 70 nm). This combination transmits the red for a color switch effect despite having no sharp cut offs. Other examples can be similarly configured to provide color switching between blue, green, red, magenta, and/or yellow.

The nano-patterned optical filters 910, 912 may be formed of a HRI material or metallic materials. In some examples, the nano-patterned optical filters 910, 912 may be formed of different coating materials, or alternatively an identical coating material, depending on the required material dispersion and the transmission spectrum. For example, the nano-patterned optical filters 910, 912 may be from two different HRI materials, two different metallic materials, one HRI material and one metallic material, the same HRI material, or the same metallic material.

In this example, the HRI or metallic layers on the two facets 902, 904 may be formed utilizing a de-capping process as described previously. However, nano-patterned optical filter 912 on the second facet 904.

In case of plasmonic nano-patterned optical filters utilizing metallic materials, a de-capping process for producing the nano-patterned optical filters 910, 912 may be necessary to provide an adequate level of UV transparency. Most metallic materials employed in the optical variable security device (OVSD) industry are absorptive at visible and particularly at UV wavelengths. De-capping may help with reducing the transmission absorption loss caused by the intrinsic material dispersion.

The high level overview of a fabrication process to construct the example pixel 900 shown in FIG. 9 is illustrated by the cross-sectional views shown in FIGS. 10A to 10E. In the example fabrication process shown in FIGS. 10A to 10E two different materials are utilized to create the form the nano-patterned optical filters 910, 912 on the two facets 902, 904. These two different materials mean that two separate material deposition steps, one for each material, is utilized as described below. In other examples in which the same material is utilized to form both of the nano-patterned optical filters 910, 912, a single deposition step may be utilized.

Figure 10A:
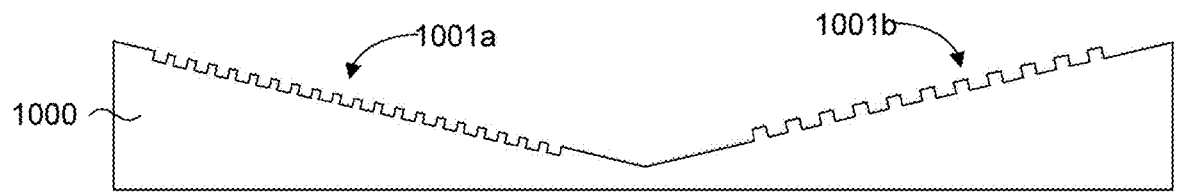
FIG. 10A is a diagrammatic representation of a cross-sectional view illustrating another example process for manufacturing a nano-patterned optical filter in accordance with many examples of the disclosure.

Structures 1001a, 1001b in FIG. 10A, corresponding to the nano-patterned optical filters 910, 912 are embossed or imprinted onto a UV or thermal resin 1000 followed by UV or thermal curing, which UV resin will correspond to the top layer 914 of pixel 900. These structures 1001a, 1001b may be referred to herein as nanostructures.

Figure 10B:
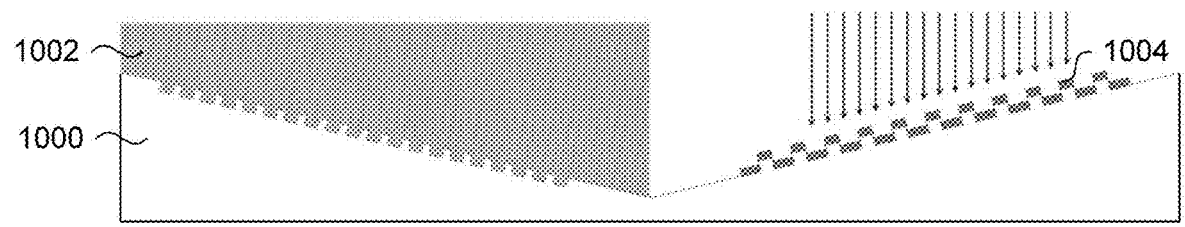
FIG. 10B is a diagrammatic representation of a cross-sectional view illustrating the example process for manufacturing a nano-patterned optical filter of FIG. 10A in accordance with many examples of the disclosure.

A photolithography process, depicted in FIG. 10B, may be utilized to form a mask 1002 over what will be the second facet 904, and then e-beam physical vapor deposition (PVD) is employed in order to coat a layer 1004 of the material for forming the nano-patterned optical filter 910 on what will be the first facet 902. The material may be either a metallic material or an HRI material.

Figure 10C:
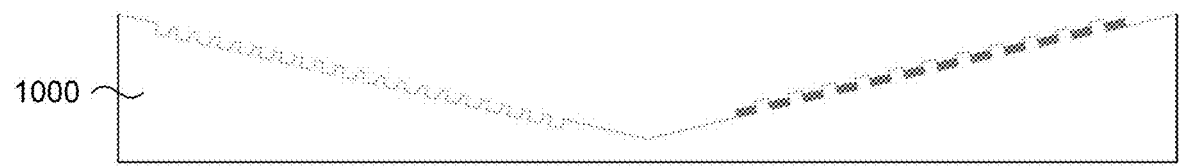
FIG. 10C is a diagrammatic representation of a cross-sectional view illustrating the example process for manufacturing a nano-patterned optical filter of FIG. 10A in accordance with many examples of the disclosure.

The photolithography resist may be stripped away following PVD using chemical agent, and a de-capping processed can be utilized to de-cap a lattice of nanoscatterers in order to end up with a perforated sheet of nanoholes on the first facet 902, which will form the nano-patterned optical filter 910, as shown in FIG. 10C.

Figure 10D:
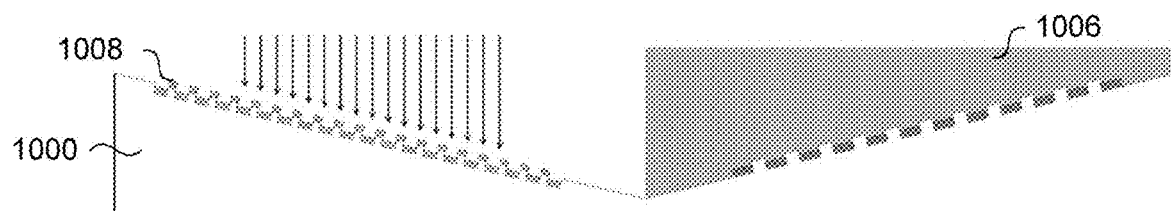
FIG. 10D is a diagrammatic representation of a cross-sectional view illustrating the example process for manufacturing a nano-patterned optical filter of FIG. 10A in accordance with many examples of the disclosure.
Figure 10E:
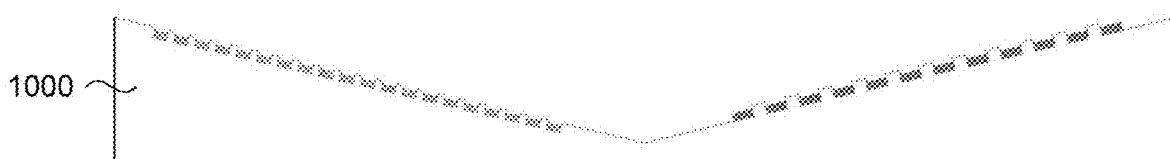
FIG. 10E is a diagrammatic representation of a cross-sectional view illustrating the example process for manufacturing a nano-patterned optical filter of FIG. 10A in accordance with many examples of the disclosure.

A similar process, depicted in FIGS. 10D and 10E, is repeated in which a mask 1006 is formed on what will be the first facet 902, and a layer 1008 of a second material is deposited on what will be the second facet 904 (FIG. 10D). A perforated metal sheet may be de-capped to end up with lattice of scatterers of the second material on what will be the second facet 904. The second material may be a metallic material or an HRI material and may be different than the material deposited in the step shown in FIG. 10B.

After the two materials are deposited to form the perforated sheet of nanoholes and the lattice of scatterers, a further layer of UV or thermal resin may be deposited over the resin layer 1000, which will form the layer 906 of LRI material of the pixel 900. In practice, the resin layer 1000 with the layers 1004, 1008 will be flipped over and applied' onto the substrate, which may be located on a secure document such as a banknote, or identification card, using the layer 906 as an adhesive. In this process, the thermal resin 1000 shown in FIGS. 10A to 10E will form the top layer 914 in the pixel 900 shown in FIG. 9. After curing, the layer of resin formed over the resin 1000 may then adhered to a substrate having UV ink as described above with reference to FIG. 9.

Figure 11:
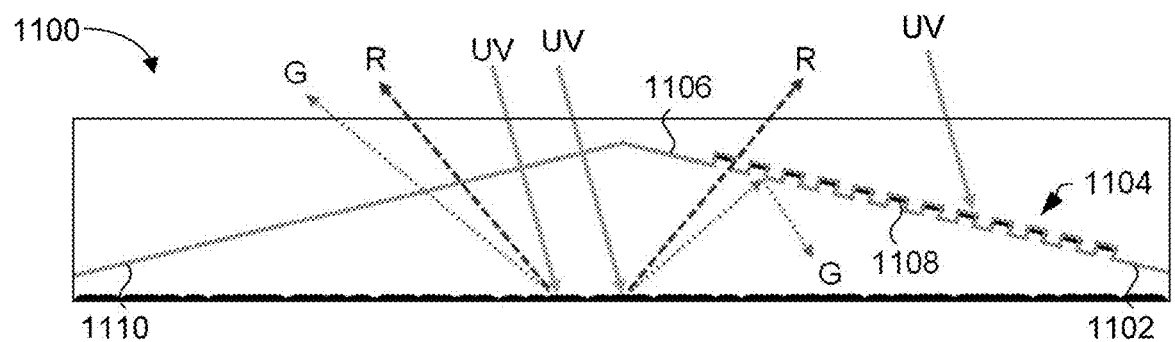
FIG. 11 is a diagrammatic representation of a cross-sectional view of another example micropixel in accordance with many examples of the disclosure.
Figure 12:
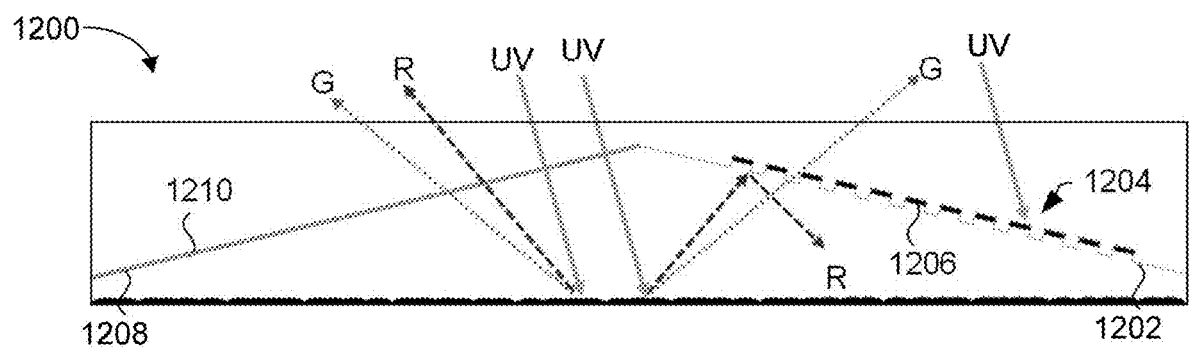
FIG. 12 is a diagrammatic representation of a cross-sectional view of another example micropixel in accordance with many examples of the disclosure.
Figure 13:
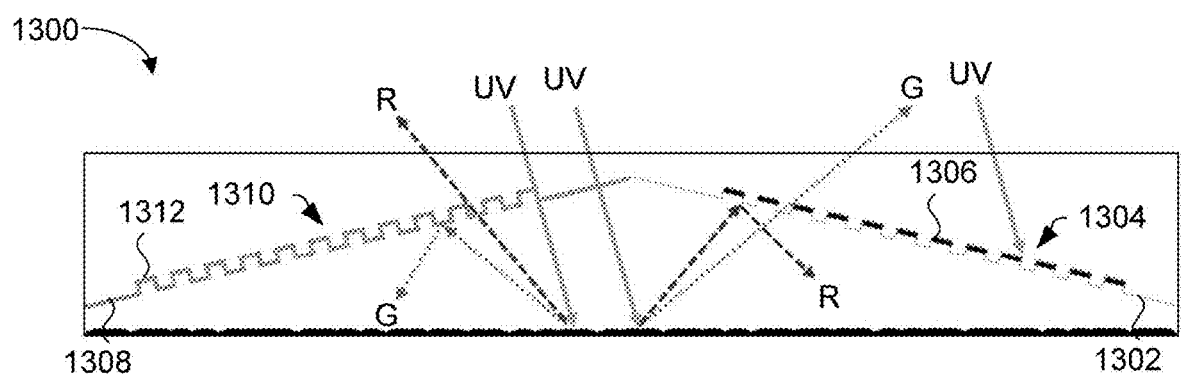
FIG. 13 is a diagrammatic representation of a cross-sectional view of another example micropixel in accordance with many examples of the disclosure.

As discussed previously, a pixel of a security feature may include both dielectric and plasmonic nano-patterned optical filters. Referring now to FIGS. 11 to 13, three specific examples of pixels of security features that include both dielectric and plasmonic nano-patterned optical filters in order to produce color and/or image switching optical effect are shown. Such nano-patterned optical filters can benefit from both Type 1 and Type 2 surface coating as describe previously with reference to FIGS. 6 and 7 and the de-capped examples of Type 1.

A cross-sectional view of a first example pixel 1100 in FIG. 11 includes a first facet 1102 of the bi-facet pixel populated with a nano-patterned optical filter 1104 coated with first layer 1106 of a first material with a Type 2 coating profile, and with a second layer 1108 of a second material with a de-capped Type 1 coating under the first layer 1106 in view the view shown in FIG. 11. As described above, the pixel 1100 is manufactured upside down compared to the view shown in FIG. 11 and therefore, during the manufacture, the second layer 1108 will be deposited over the first layer 1106.

The second facet 1110 does not include nanostructures and is coated only with the first layer 1106 of the first material. In the example shown in FIG. 11, the second facet 1110 facilitates the efficient transmission of UV light if the first material is chosen to be a HRI UV transparent dielectric material such as, for example, $TiO_2$ or $Nb_2O_5$.

The nano-patterned optical filter 1104 formed on the first facet 1102 from the combination of HRI dielectric material used in the first layer 1106 and de-capped second layer 1108 of the second material results in the red (R) component of the fluorescent light to transmit while inhibiting the transmission of the green (G) component. The second material used for the second layer 1108 may be selected as a plasmonic material, such as, for example, aluminum, or another UV-absorptive HRI dielectric material, such as Silicon.

Selective coating of different facets in the example shown in FIG. 11 may be realized using a fabrication process similar to the process described previously with reference to FIGS. 10A to 10E.

In the example pixel 1100 shown in FIG. 11, the second facet 1110 provides a UV transmissive opening window for both UV and visible light. A user will observe a color shifting of the yellow light when looking along the viewing angle of the second facet 1110 and within a certain spatial space and will observe an image switching effect when navigating between the viewing angles of the two facets 1102, 1110. The first layer 1106 of the first material should not be a material that is absorptive at either UV or visible wavelengths of light.

A cross-sectional view of a second example pixel 1200 is shown in FIG. 12. The first facet 1202 of the example pixel 1200 is populated with a nano-patterned optical filter 1204 formed of a first layer 1206 of a first material that is formed utilizing a de-capped Type 1 coating. The second facet 1208 does not include nanostructures is coated with a second layer 1210 of second material. Similar to the example second facet 1100 of the pixel 1100 shown in FIG. 11, the second facet 1208 facilitates efficient transmission of UV light if the second layer 1210 is formed of HRI UV transparent dielectric material.

In the example shown in FIG. 12, the nano-patterned optical filter 1204 formed on the first facet 1202 facilitates transmission of the green (G) component of the fluorescent light and inhibits the transmission of the red component (R). The first material forming the first layer 1206 may be selected from a plasmonic material or UV-absorptive HRI dielectric material.

The second facet 1208 functions as a UV transparent opening window for both UV and visible light. A user will observe a color shifting of the yellow light when looking at a viewing angle associated with the second facet 1206 and within a certain spatial space and will observe an image switching effect when navigating between the viewing angles of the two facets 1202, 1206. The second material of the second layer 1210 cannot be selected as an absorptive material neither at UV nor at visible wavelengths.

In of the examples shown in FIGS. 11 and 12, a signal-to-noise ratio can be defined as the intensity of the optical power delivered from each facet (signal) to the intensity of the unwanted optical power (noise), including stray light, diffraction from either facets, or the crosstalk with the alternative facet. Cross talk plays an important role as a noise component and may gives rise to the observer seeing a different color than intended. For example, the fluorescent visible light transmitted from the second facet 1110, 1208 may crosstalk with the filtered visible light when the user is facing the first facet 1102, 1202. The absorption caused by the plasmonic or absorptive HRI nano-patterned surfaces at the first facet 1102, 1202 reduces the desired optical power (signal) whereas the color-shifted cross-talking optical power experiences small absorption when transmitting from the second facet 1110, 1206 (noise). In this case, the size of the opening window on the second facet 1110, 1206 may be chosen smaller than the facet size to increase the signal-to-noise ratio. The remaining area outside of the opening window of the second facet 1110, 1206 may be coated with an alternative UV-absorptive or UV-reflective coating, including the second material.

A cross sectional view of a third example pixel 1300 is shown in FIG. 13. The first facet 1302 of the example pixel 1300 is populated with a nano-patterned optical filter 1304 coated with a first layer 1306 of a first material that is formed using a de-capped Type 1 coating process. The second facet 1308 is populated with another nano-patterned optical filter 1310 formed from a second layer 1312 of a second material that is formed with a Type 2 coating process.

In this example pixel 1300, the first facets 1302 and the second facet 1308 function as red and green filters, respectively. The second layer 1312 on the second facet 1308 may be UV transparent HRI dielectric material, whereas the first layer 1306 on the first facet 1302 may be a plasmonic material or UV-absorptive HRI dielectric material. Similar to the examples shown in FIGS. 11 and 12, only the second facet 1308 facilitates the transmission of UV light downward to the substrate. Further, similar to the example pixel 1200 shown in FIG. 12, the area of the nano-patterned optical filter 1310 on the second facet may be controlled to enhance the signal-to-noise ratio. In this case, the remaining area of the second facet 1306 may be similarly coated with an alternative UV-absorptive or UV-reflective coating, including the first material utilized to form the first layer 1306.

The examples shown in FIGS. 11 to 13 are extendible to pixels that include more than two facets, provided that the facet-to-facet signal-to-noise ratio is controlled by controlling the size of the opening window and the angular spacing of individual facets with respect to each other.

The angular dependence of the transmission through a nano-patterned optical filter may induce a color-shifting effect similar to that of multi-layer stacked filters. Such a color shifting effect should not be confused with the color-switching effect described previously with reference to FIG. 3.

Desirably, the transmission of nano-patterned optical filters employed in certain applications is relatively insensitive to the incident and viewing angles, such that the user observes a single and stable hue within a certain range of viewing angles, $\Delta\theta$. Desirably, the user observes a single and stable hue in the range $\Delta\theta<\pm25°$, in proximity to the surface normal of a facet. To inhibit the user's observation of color shifting effects, the angle difference between the surface normals of adjacent facets, $\Delta\theta_{ab}$, may be configured to match the boundaries of this finite space in which the hue is stable. This difference in surface normal angle facilitates that the color observed by the user from each pixel will switch to a new hue, when the viewing angle shifts by the angle between facets, $\Delta\theta_{ab}$, rather than shifting gradually, thus a prominent color-switching effect is exhibited.

The colorshift of a nano-patterned optical filter versus the viewing angle is related to the angular dependence of the dominant resonance around the transmission dip. While the hue depends on the resonance wavelength in the visible spectrum, the color saturation is related to the linewidth of the spectral dip. For example, in dielectric nano-patterned optical filters, both of the color hue and saturation characteristics are related to the type of the electromagnetic dipole and its mode confinement. FDTD simulations on dielectric nano-patterned optical filters indicate that the transmission resonances of magnetic dipoles are more resistant to the incident angle of the excitation beam, thus undergo a smaller colorshift in a certain viewing zone as compared to the electric dipole.

The thickness of the film of HRI material or metallic material can be conveniently increased in Type 1 and Type 2 profiles, shown in FIGS. 6 and 7 respectively. However, as noted previously, these geometries may become excessively lossy at UV wavelengths for certain materials such as a-Si. Geometries like lattice of scatterers or a perforated sheet of nanoholes may provide the required UV transparency for such absorptive materials, but the thickness of the layer of HRI or metallic material is restricted by the manufacturability of such geometries. As described previously, a lattice of scatterers and a perforated sheet of nanoholes can be manufactured using a technique utilizing a nano-scale de-capping process. The feasibility of the de-capping process is associated with the density of nanostructures and D/P ratio together with HRI film thickness.

Figure 14:
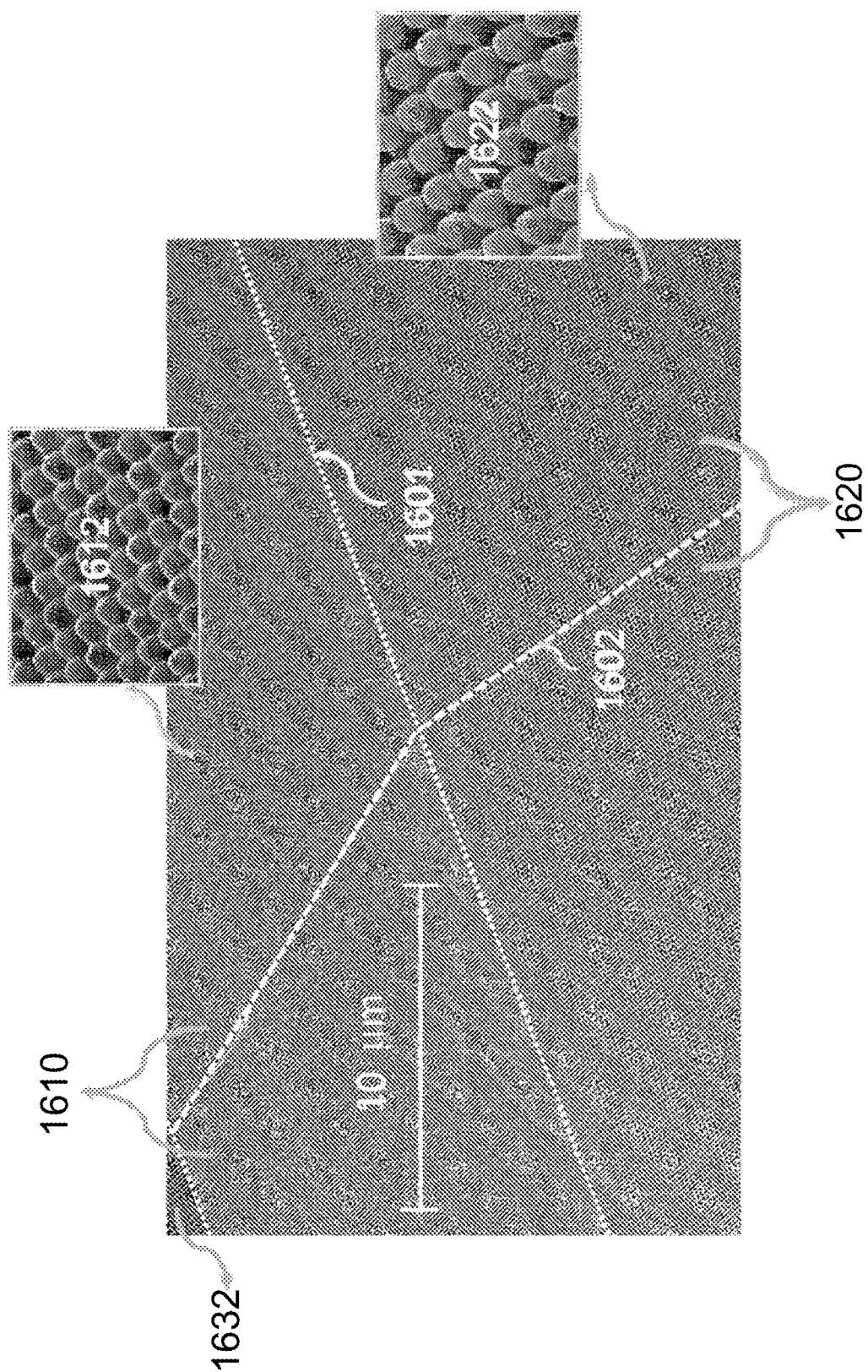
FIG. 14 is an SEM photographic representation of an example pixel showing two facets. The inset images are magnified views of the nano-patterned optical filter of the respective facets.

A SEM photograph of a portion of an example pixel 1600 showing three facets, including facet 1610 and facet 1620, is shown in FIG. 14. A first dotted white line 1601 shows the dihedral edge of the pixel where facet 1610 meets facet 1620. A second dotted white line 1602 shows the relative angular orientation of the two facets. Facet 1610 includes a first nano-patterned optical filter 1612. Facet 1620 includes a second nano-patterned optical filter 1622. A third facet is visible in the top left corner of the photograph and includes a third nano-patterned optical filter 1632. The inset photographs show the structure of each of these nano-patterned optical filters in greater detail. Both filters are composed of a two dimensional array of posts. The posts forming nano-patterned optical filter 1610 are smaller and have a smaller period in both dimensions compared to the posts forming nano-patterned optical filter 1620. Both nano-patterned optical filters are coated with silver, sputtered to provide conformal metal coverage over the underlying resin nanostructures. A 10 micron scale is shown for reference. Due to the difference in size and shape, the two nano-patterned optical filters have different transmission characteristics.

In general, the size of pixels in the examples described above can vary as desired. Typically, pixels have a dimension (e.g., but not limited to, length, width, diagonal dimension) in a range from 30 microns to 100 microns (e.g., about 40 microns or more, about 50 microns or more, about 60 microns or more, about 90 microns or less, about 80 microns or less, about 70 microns or less). In some examples, pixels have a dimension of 32 microns, 64 microns, or 92 microns.

Furthermore, the number of facets in a pixel can vary depending on the implementation. The number of facets depends on the relative size of the pixel and the facets. The facet size can also vary depending on the implementation. Generally, facets can be sufficiently large to be resolved by unaided human vision. In some examples, facets have a dimension (e.g., edge length, diagonal) in a range from microns to 50 microns (e.g., about 5 microns or more, about 10 microns or more, about 15 microns or more, about 20 microns or more, about 25 microns or more, about 30 microns or more, about 35 microns or more, about 40 microns or more, about 45 microns or less, about 40 microns or less, about 35 microns or less, about 30 microns or less, about 25 microns or less). Typically, facets are sufficiently large to be resolved by the human eye.

In some cases, a pixel can have only two facets. In other cases, pixels have more than two facets, such as three or more, four or more, five or more, six or more, seven or more, eight or more facets. In cases where pixels are large and/or facets are small, a pixel can have tens or hundreds of facets. For instance, certain pixels can have about 100 facets or more (e.g., about 200 facets or more, about 500 facets or more, about 700 facets or less, about 600 facets or less, about 500 facets or less).

In some examples, a pixel can include facets of differing size and/or shape. For example, a two-facet pixel can include a small facet and a large facet (e.g., about 10% or larger, about 20% or larger, about 50% or larger, about 100% larger, by area, than the small facet). Pixels with more than two facets can include facets of two or more different sizes and/or shapes. In some cases, every facet has a different size and/or shape. In certain cases, larger facets will appear brighter than smaller facets (e.g., where the UV transmissivity and fluorescence transmissivity of the nano-patterned optical filter is comparable for the facets).

The relative orientation between adjacent facets can also vary depending on the implementation. The relative orientation between facets can be represented by either the angular orientation difference of the normal vectors to the plane of adjacent facets or by the dihedral angle between these planes. As used herein, the "angular orientation difference" refers to the former, while the latter will be referred to as the "dihedral angle". In general, adjacent facets are oriented at a sufficiently large angular difference to provide a clear image shift between adjacent facets. In some examples, the angular orientation difference is 15° or more (e.g., about 20° or more, about 25° or more, about 30° or more, about 35° or more, about 40° or more, about 45° or more, about 50° or more, about 55° or more, about 60° or more, about 90° or less, about 85° or less, about 80° or less, about 75° or less, about 70° or less, about 65° or less, about 60° or less, about 55° or less, about 50° or less). In certain cases, crosstalk between images is unacceptably large for angular orientation differences of less than 15°.

Facet orientation can also be controlled so that light transmitted by one facet is not occluded by an adjacent pixel. For example, for each pixel, the facet with the steepest face (with respect to the plane of the facet) can have a surface normal that is 45° or greater (e.g., about 50° or greater, about 60° or greater, about 70° or greater) with respect to the plane of the facet.

Examples of the present disclosure provide security features that provide a color switched effect or an image switching effect, or both. The security features include pixels having multiple facets that may include nano-patterned optical filters. The nano-patterned optical filters of each facet may be a dielectric nano-patterned optical filter formed of a HRI material or a plasmonic nano-patterned optical filter formed of a metallic material. The security features of the present disclosure enable providing a color switching or image switching effect without necessitating multiple pairs of HRI-LRI layers utilized in conventional interferometer security features, which addresses manufacturing challenges exhibited by such conventional security features.

Figure 15:
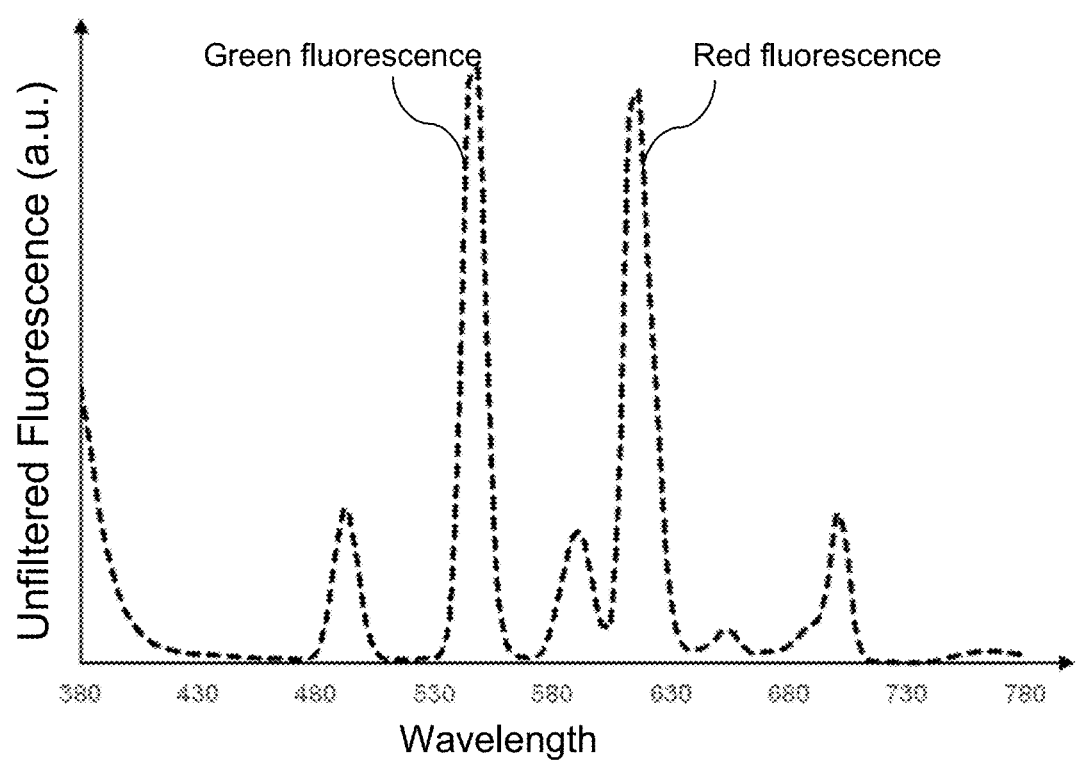
FIG. 15 is a plot showing the fluorescence of the UV ink layer, embedding green and red pigments, resolved by spectrophotometry and without the introduction of plasmonic (silver) nanostructure filter.

FIG. 15 is graph showing the magnitude of light (over a wavelength from 380 nm to 780 nm) emitted from a microstructure pixel of the type shown in FIG. 9, but in which the two facets of the microstructure pixel have no nanostructures and no plasmonic filters. Irradiating UV radiation passes into the microstructure, and reaches the fluorescing ink on the substrate such that the fluorescing ink emits light in the visible spectrum (including red and green visible light), so that some of the visible light passes back out of the microstructure. The graph of FIG. 15 shows the magnitude of the light (passing back out of the microstructure pixel) as detected by a spectrophotometer. Due to the type of fluorescing ink, the light emitted from the microstructure has a peak of green light and a peak of red light as shown in FIG. 15.

Figure 16:
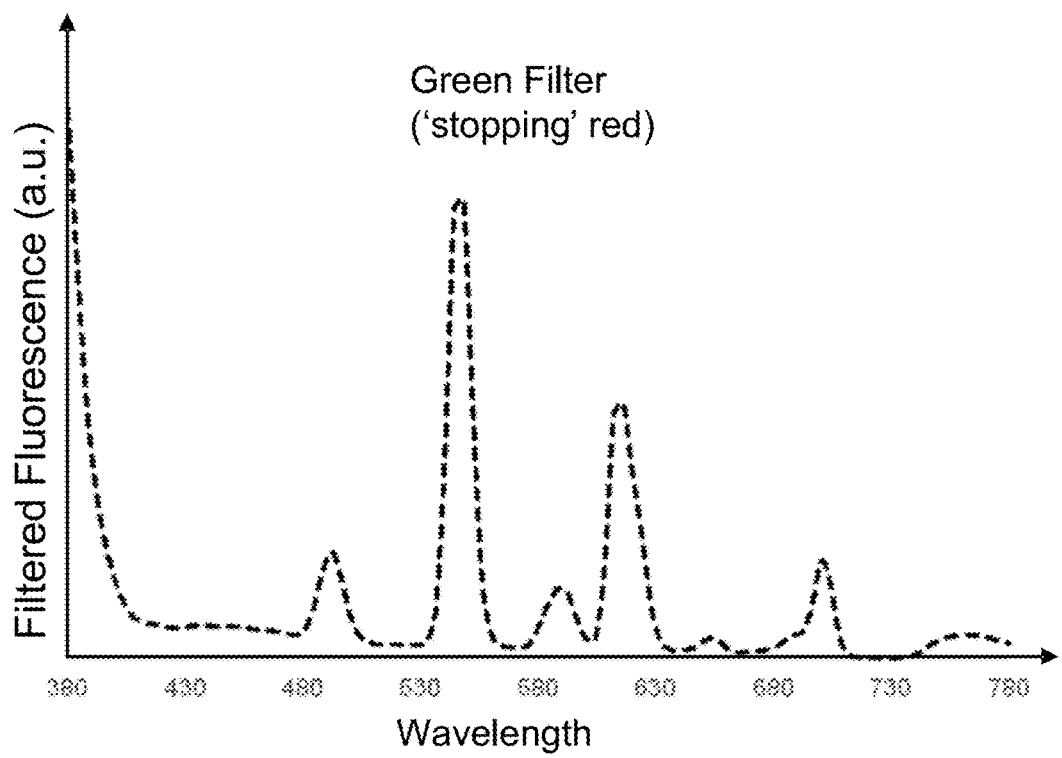
FIG. 16 is a plot showing the fluorescence of the UV ink layer, embedding green and red pigments, measured after the application of a green filter on the ink layer.

FIG. 16 is a graph like that of FIG. 15, except that the microstructure pixel 900 has a second optical filter 912 (green filter) that substantially blocks red light on the second facet 904 (the facet shown on the right in FIG. 9) and a first optical filter 902 (red filter) that substantially blocks green light on the first facet 902. The optical filters are plasmonic (silver) filters. FIG. 16 shows the magnitude of light (over a wavelength from 380 nm to 780 nm) emitted from the microstructure pixel when the viewing angle is normal to the surface of the second facet. The optical filter 912 on the second facet 904 is said to have a stopband, and this stopband is for light of wavelengths from 610 nm to 750 nm. The optical filter 912 suppresses red light such that the aggregate amount of red light (in a range from 610 nm to 750 nm) is less 60% of the aggregate amount of green light (in a range from 530 nm to 460 nm), when the microstructure pixel is irradiated with UV radiation as in the case of FIG. 15, and when the light emitted from the microstructure pixel is detected at a viewing angle normal to the surface of the second facet 904 using a spectrophotometer. An optical filter that is observed to have this characteristic is said to be a "green filter."

In one example, the green filter blocks less than 30% of light at all wavelengths in a range of from 430 nm to 780 nm, except in the stopband (from 610 nm to 750 nm) in which the green filter blocks 80% or more of the light.

Figure 17:
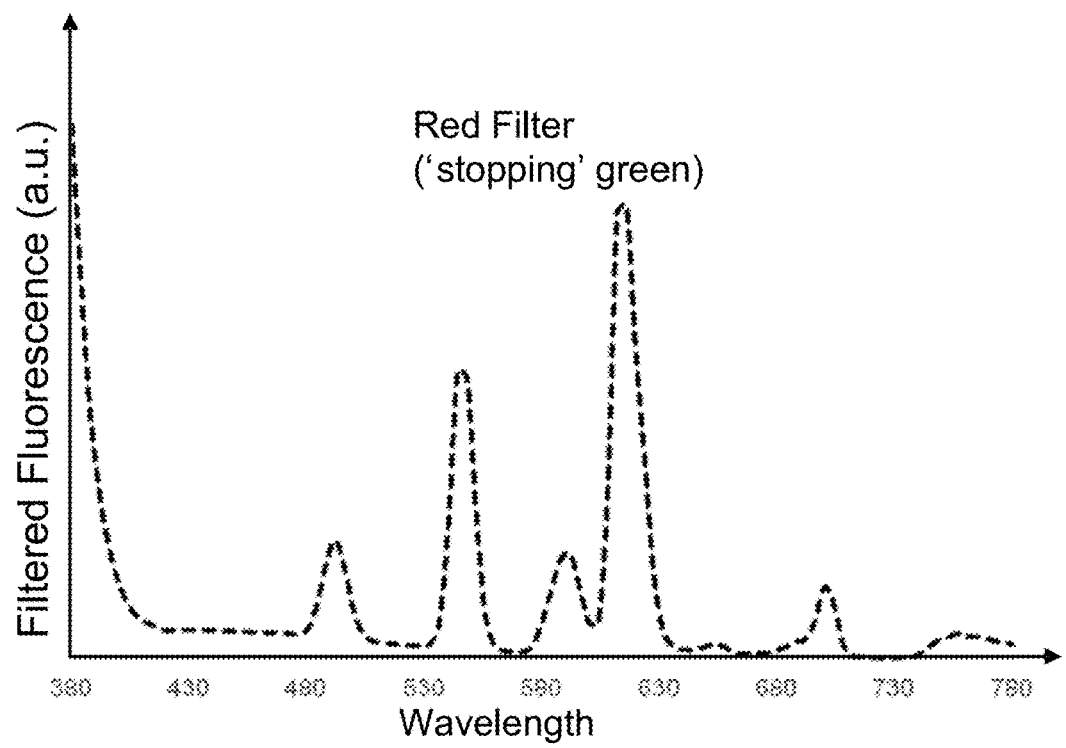
FIG. 17 is a plot showing the fluorescence of the UV ink layer, embedding green and red pigments, measured after the application of a red filter on the ink layer.

FIG. 17 is a graph like that of FIG. 16 for the microstructure pixel 900, except that the viewing angle is normal to the surface of the first facet 902. The vertical filtered fluorescence scale axis in the graphs of FIG. 16 and FIG. 17 is identical. The optical filter 910 on the first facet 902 is said to have a stopband, and this stopband is for light of wavelengths from 530 nm to 560 nm. The optical filter 910 suppresses green light such that the aggregate amount of green light (in a range from 530 nm to 560 nm) is less 60% of the aggregate amount of red light (in a range from 610 nm to 750 nm), when the microstructure pixel is irradiated with UV radiation as in the case of FIG. 15, and when the light emitted from the microstructure pixel is detected at a viewing angle normal to the surface of the first facet 902 using a spectrophotometer. An optical filter that is observed to have this characteristic is said to be a "red filter."

In one example, the red filter blocks less than 30% of light at all wavelengths in a range of from 430 nm to 780 nm, except in the stopband (from 530 nm to 560 nm) in which the red filter blocks 80% or more of the light.

The relative suppression of red light versus green light between the green filter 912 and the red filter 910 is enough for a human eye to notice a distinctive color switch, as confirmed by inspection of the microstructure pixel under UV illumination, as the viewing angle (viewing of the overall microstructure pixel) changes from the surface normal of the second facet looking at the second facet, to the surface normal of the first facet looking at the first facet.

The security feature 102 comprising a plurality of microstructure pixels, where at least one of the microstructure pixels has: 1) a first facet having nanostructures arranged and sized to form a green filter, and 2) a second facet having nanostructures arranged and sized to form a red filter, may be made using a nanoprint lithography stamp. The stamp may be made starting with a silicon wafer. A thick layer of resist is spin coated onto the wafer. E-beam lithography is employed to pattern microstructure forms into the resist. After development, plasma etching is performed to etch into the silicon wafer such that the pattern of microstructures is transferred from the resist into the surface of the wafer. Next, a thin conformal layer of resist is applied over the silicon microstructures on the wafer. A second e-beam lithograph step is performed to pattern the nanostructures onto the facets of the silicon microstructures of the wafer. After development, an etching step is performed to form the nanostructrures onto/into the facets of the silicon microstructures. Next, a seed layer of thin metal (such as nickel) is applied, and the seed layer is electroplated to form a conformal metal layer. The metal is then detached from the silicon, forming the stamp. To make a security feature, a layer is resin is imprinted using the stamp, such that the pattern of microstructures is embossed into the resin. The resin is then cured. A highly reflective thin film may be incorporated onto the surface of the imprinted resin. Selected parts of the metal are then removed to make the final security feature. The de-capping process illustrated in FIG. 8A, FIG. 8B, FIG. 8C, and FIG. 8D can then be employed to form the final security feature.

It is to be understood that the above description is intended to be illustrative, and not restrictive. Many other implementations will be apparent to those of skill in the art upon reading and understanding the above description. Although the present disclosure has been described with reference to specific example implementations, it will be recognized that the disclosure is not limited to the implementations described but can be practiced with modification and alteration within the scope of the appended claims. Accordingly, the specification and drawings are to be regarded in an illustrative sense rather than a restrictive sense. Although various features of the approach of the present disclosure have been presented separately (e.g., in separate figures), the skilled person will understand that, unless they are presented as mutually exclusive, they may each be combined with any other feature or combination of features of the present disclosure While this specification contains many details, these should not be construed as limitations on the scope of what may be claimed, but rather as descriptions of features specific to particular examples. Certain features that are described in this specification in the context of separate implementations can also be combined. Conversely, various features that are described in the context of a single implementation can also be implemented in multiple examples separately or in any suitable subcombination.

Those skilled in the art will recognize, or be able to ascertain, using no more than routine experimentation, numerous equivalents to the specific examples described specifically herein. Such equivalents are intended to be encompassed in the scope of the following claims.

What is claimed is:

1. An optical security feature comprising:
   a plurality of microstructure pixels, wherein at least one of the microstructure pixels comprises:
   a substrate portion that emits light of at least a first wavelength and a second wavelength different from the first wavelength; and
   a microstructure comprising a first facet and a second facet non-parallel to the first facet, the microstructure comprising:
   a first nano-patterned optical filter provided on the first facet, the first nano-patterned optical filter having a first stopband that includes the first wavelength and does not include the second wavelength; and
   a second nano-patterned optical filter provided on the second facet, the second nano-patterned optical filter having a second stopband that includes the second wavelength and does not include the first wavelength.

2. The optical security feature of claim 1, wherein the substrate portion comprises a fluorescent material that when irradiated by UV light emits light of the first wavelength as well as light of the second wavelength.

3. The optical security feature of claim 1, wherein the one microstructure pixel when irradiated with UV radiation and viewed from a first viewing angle normal to a major surface of the first facet emits more light from the first facet of the second wavelength than it emits light of the first wavelength, and wherein the one microstructure pixel when irradiated with UV radiation and viewed from a second viewing angle normal to a major surface of the second facet emits more light from the second facet of the first wavelength than it emits light of the second wavelength.

4. The optical security feature of claim 1, wherein the one microstructure pixel when irradiated with UV radiation and viewed from a first viewing angle normal to a major surface of the first facet emits a first aggregate amount of light in a first wavelength range and emits a second aggregate amount of light in a second wavelength range, wherein the second aggregate amount is less than 60% of the first aggregate amount, and wherein the one microstructure pixel when irradiated with UV radiation and viewed from a second viewing angle normal to a major surface of the second facet emits a first aggregate amount of light in a first wavelength range and emits a second aggregate amount of light in a second wavelength range, wherein the first aggregate amount is less than 60% of the second aggregate amount.

5. The optical security feature of claim 1, wherein the one microstructure pixel when the viewed at a first viewing angle appears a first color, and when viewed at a second viewing angle appears a second color.

6. The optical security feature of claim 1, wherein the microstructure comprises a transparent material substantially transparent to light of the first wavelength, light of the second wavelength, and to UV radiation.

7. The optical security feature of claim 6, wherein the transparent material is a resin.

8. The optical security feature of claim 1, wherein the first nano-pattered optical filter comprises a plurality of nano-holes.

9. The optical security feature of claim 1, wherein the first nano-pattered optical filter comprises a plurality of nanoposts.

10. The optical security feature of claim 1, wherein the first nano-patterned optical filter comprises a first lattice of nanostructures having a first lattice periodicity, P1, a first nanostructure dimension, D1, selected according to the first stopband, and wherein the second nano-patterned optical filter comprises a second lattice of nanostructures having a second lattice periodicity, P2, and a second nanostructure dimension, D2, selected according to the second stopband.

11. The optical security feature of claim 10, wherein a first ratio D1/P1 and a second ratio D2/P2 are within the range of 0.1 to 0.9.

12. The optical security feature of claim 10, wherein a first ratio D1/P1 and a second ratio D2/P2 are within the range of 0.25 to 0.75.

13. The optical security feature of claim 1, wherein the angle between the surface normal of the first facet and the surface normal of the second facet is at least 25°.

14. The optical security feature of claim 1, wherein the microstructure comprises more than two facets, each facet being non-parallel to the other facets, and wherein each facet comprises a nano-patterned optical filter that is configured with a stopband that is different than stopbands of the other facets such that a unique color is emitted along the viewing angle of each of the facets.

15. A method comprising:
providing a microstructure on a substrate, wherein the substrate includes a UV fluorescent material that when irradiated with UV radiation emits visible light of a first wavelength and a second wavelength, wherein the microstructure has a first facet and a second facet;
providing a first nano-patterned optical filter on the first facet, wherein the first nano-patterned optical filter has a first stopband that includes the first wavelength and does not include the second wavelength; and
providing a second nano-patterned optical filter on the second facet, wherein the second nano-patterned optical filter has a second stopband that includes the second wavelength and does not include the first wavelength.

16. The method of claim 15, wherein the substrate is disposed on a banknote.

17. A method comprising:
embossing a microstructure into a resin layer, wherein the resin layer is disposed on a substrate, and wherein the substrate includes a UV fluorescent material that when irradiated with UV radiation emits visible light of a first wavelength and a second wavelength, wherein the microstructure has a first facet and a second facet;
forming a first nano-patterned optical filter on the first facet, wherein the first nano-patterned optical filter has a first stopband that includes the first wavelength and does not include the second wavelength; and
forming a second nano-patterned optical filter on the second facet, wherein the second nano-patterned optical filter has a second stopband that includes the second wavelength and does not include the first wavelength.

18. The method of claim 17, further comprising:
attaching the substrate with the microstructure disposed on the substrate onto a banknote.

19. The method of claim 17, wherein the first stopband is a first range of wavelengths of visible light, wherein the second stopband is a second range of wavelengths of visible light, and wherein the first and second stopbands do not overlap.

20. The method of claim 17, wherein the first nano-patterned optical filter comprises a plurality of nanoposts.

* * * * *